US008123617B2

(12) United States Patent
Oomori

(10) Patent No.: US 8,123,617 B2
(45) Date of Patent: Feb. 28, 2012

(54) GAME SYSTEM AND CONTROLLING METHOD THEREOF

(75) Inventor: Tomoaki Oomori, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 967 days.

(21) Appl. No.: 12/115,912

(22) Filed: May 6, 2008

(65) Prior Publication Data

US 2009/0227376 A1 Sep. 10, 2009

Related U.S. Application Data

(60) Provisional application No. 61/034,723, filed on Mar. 7, 2008.

(51) Int. Cl.
*A63F 13/12* (2006.01)
*A63F 9/24* (2006.01)

(52) U.S. Cl. ................. 463/41; 463/43; 463/42; 463/25

(58) Field of Classification Search .................... 463/41, 463/43, 42, 25
See application file for complete search history.

(56) References Cited

U.S. PATENT DOCUMENTS

| | | | |
|---|---|---|---|
| 5,178,390 | A | 1/1993 | Okada |
| 5,280,909 | A | 1/1994 | Tracy |
| 5,564,700 | A | 10/1996 | Celona |
| 6,416,409 | B1 | 7/2002 | Jordan |
| 6,604,999 | B2 | 8/2003 | Ainsworth |
| 2002/0065124 | A1 | 5/2002 | Ainsworth |

*Primary Examiner* — Dmitry Suhol
*Assistant Examiner* — Michael Grant
(74) *Attorney, Agent, or Firm* — NDQ&M Watchstone LLP

(57) ABSTRACT

A game system of the present invention has a plurality of gaming machines capable of communicating with each other via a communication line. The plurality of gaming machines each have an input device operable to input an insurance BET. The plurality of gaming machines carry out the following processing. The plurality of gaming machines store a first predetermined value in a memory and count the insurance BET input from the input device in an accumulative manner. Then, the plural types of symbols displayed on the display are automatically re-arranged. As result of repeating a game, if it is judged that the insurance BET number accumulatively counted at least two or more gaming machines from the plurality of gaming machines has reached the first predetermined value, the accumulated insurance BET numbers are summed up. The plurality of gaming machines execute a common game, and then, award a prize including a total insurance BET number to a specified gaming machine based on an outcome of the common game thus executed.

7 Claims, 15 Drawing Sheets

LINK GAME PROCESSING

LINK GAME PROCESSING

FIG.4

| CODE NO. | SYMBOL | SYMBOL | SYMBOL | SYMBOL | SYMBOL |
|---|---|---|---|---|---|
| 00 | EARTH | JUPITER | SATURN | VENUS | MARS |
| 01 | A | EARTH | JUPITER | SATURN | VENUS |
| 02 | Q | A | EARTH | JUPITER | SATURN |
| 03 | J | Q | A | EARTH | JUPITER |
| 04 | K | J | Q | A | EARTH |
| 05 | SUN | K | J | Q | A |
| 06 | MERCURY | SUN | K | J | Q |
| 07 | MARS | MERCURY | SUN | K | J |
| 08 | VENUS | MARS | MERCURY | SUN | K |
| 09 | SATURN | VENUS | MARS | MERCURY | SUN |
| 10 | JUPITER | SATURN | VENUS | MARS | MERCURY |
| 11 | EARTH | JUPITER | SATURN | VENUS | MARS |
| 12 | A | EARTH | JUPITER | SATURN | VENUS |
| 13 | Q | A | EARTH | JUPITER | SATURN |
| 14 | J | Q | A | EARTH | JUPITER |
| 15 | K | J | Q | A | EARTH |
| 16 | SUN | K | J | Q | A |
| 17 | MERCURY | SUN | K | J | Q |
| 18 | MARS | MERCURY | SUN | K | J |
| 19 | VENUS | MARS | MERCURY | SUN | K |
| 20 | SATURN | VENUS | MARS | MERCURY | SUN |
| 21 | JUPITER | SATURN | VENUS | MARS | MERCURY |

FIG.5

SCATTER PRIZE

| SYMBOL | NUMBER OF SYMBOLS DISPLAYED ON DISPLAY DEVICE | | |
|---|---|---|---|
| | THREE | FOUR | FIVE |
| A | 2 | 4 | 6 |
| J | 4 | 8 | 12 |
| K | 6 | 12 | 18 |
| Q | 8 | 16 | 24 |
| MERCURY | 10 | 20 | 30 |
| MARS | 20 | 40 | 60 |
| VENUS | 30 | 60 | 100 |
| SUN | 40 | 80 | 120 |
| SATURN | 50 | 100 | 200 |
| JUPITER | 70 | 140 | 280 |
| EARTH | TRIGGER SYMBOL FOR SPECIAL PRIZE | | |

※PAYOUT NUMBER OF COINS FOR ONE COIN ENTRY

GAME SELECTION PROCESSING

LINK GAME PROCESSING

GAME SYSTEM AND CONTROLLING METHOD THEREOF

CROSS-REFERENCE TO RELATED APPLICATIONS

This application claims priority of U.S. Provisional Application No. 61/034,723 filed on Mar. 7, 2008. The contents of this application are incorporated herein by reference in their entirety.

BACKGROUND OF THE INVENTION

1. Field of the Invention

The present invention relates to a game system and a controlling method thereof.

2. Description of the Related Art

Conventionally, a game system is provided with a plurality of slot machines and a server device which are connected so as to allow communication therebetween via a communication line. A part of the gaming media inserted in each slot machine are accumulated in a cumulative manner in the server device, and a payout (JACKPOT) inclusive of the gaming media accumulated in the server device is awarded to each slot machine in accordance with a game outcome at each slot machine. Related conventional art is disclosed, for instance, in U.S. Pat. No. 6,416,409-B2, U.S. Pat. No. 5,280,909-B2 and U.S. Pat. No. 5,564,700-B2.

In conventional slot machines, apart from inserting coins to start a game, coins for insurance are also inserted, and a predetermined insurance premium is awarded if the invested value consumed with each execution of the game reaches a predetermined accumulated value. This is disclosed in U.S. Pat. No. 5,178,390, for instance.

In the conventional slot machines, if a predetermined combination of symbols is displayed in a stopped state along a payline, a predetermined number of gaming media are then paid out in accordance with the combination of symbols. Regardless of the payline, further, a predetermined number of gaming media are paid out, corresponding to the number of specific symbols referred to as scatter symbols, which were displayed on the display device. This is disclosed, for example, in U.S. Pat. No. 6,604,999-B2 and US 2002-065124-A1.

The present invention provides a game system and a controlling method thereof, which can offer entertainability to players that has not been successfully attained by those of the aforementioned conventional art.

SUMMARY OF THE INVENTION

According to a first aspect of the present invention, there is provided a game system having the following configuration. The game system has a plurality of gaming machines capable of communicating with each other via a communication line. The plurality of gaming machines each have: (i) a display device onto which a plurality of types of symbols are arranged; (ii) an input device operable to input an insurance BET; (iii) at least one memory; and (iv) a controller. The controller is configured to: (a) store a first predetermined value and a second predetermined value in the memory; (b) accept an insurance BET input from the input device; (c) count the insurance BET thus accepted in an accumulative manner, and store the insurance BET number thus counted in the memory; (d) automatically re-arrange the plurality of types of symbols arranged on the display device; (d-1) judge whether a predetermined state of arrangement of symbols is established on the display device on which the symbols are rearranged at the itemized (d); (d-2) count the predetermined symbol arrangement state as one count, and store the counted value in the memory in a case where it is judged, as a result of the judgment at the itemized (d-1), that the predetermined symbol arrangement state is established; (d-3) judge whether the counted value of arrangement state of the predetermined symbols stored at the itemized (d-2) reaches a second predetermined value stored at the itemized (a), as a result of repeating processing from the itemized (b) to (d-2); (d-4) award a prize of a predetermined value, and reset the insurance BET number stored at the itemized (c) to a default value in a case where it is judged, as a result of the judgment at the itemized (d-3), that the count value reaches the second predetermined value; (e) judge whether the insurance BET number stored accumulatively at the itemized (c) reaches the first predetermined value stored at the itemized (a) as a result of repeating processing from the itemized (b) to (d); (f) judge whether a same result as the judgment result is obtained by at least two or more gaming machines from among the plurality of gaming machines in a case where it is judged, as a result of the judgment at the itemized (e), that the insurance BET number stored accumulatively at the itemized (c) reaches the first predetermined value stored at the itemized (a); (g) sum up the accumulated insurance BET number of the at least two or more gaming machines of the plurality gaming machines stored accumulatively at the itemized (c), and store a total insurance BET number summed up in the memory, in a case where it is judged, as a result of the judgment at the itemized (f), that the insurance BET number of the at least two or more gaming machines of the plurality of gaming machines stored accumulatively reaches the first predetermined value; (h) execute a common game shared among the at least two or more gaming machines of the plurality of gaming machines; and (i) award a prize to a specific gaming machine from the at least two or more gaming machines from among the plurality of gaming machines, the prize including the total insurance BET number stored at the itemized (g), based on an outcome of the common game thus executed.

According to the first aspect of the present invention, even if the number of times for the predetermined symbol arrangement state fails to reach the second predetermined value set in advance (for instance, 50 times) and a prize having a predetermined value (for instance, a future game) fails to be won, in a case where the insurance BET number invested, as insurance, in the plurality of game machines has reached the first predetermined value (for instance, 500 coins), a specific gaming machine can award a prize including a value obtained by summing up the insurance BET number (for instance, 1600 coins) accumulated in each gaming machine. Thus, a prize is reliably provided, as insurance, to any of the plurality of gaming machines at which the invested insurance BET number has reached the first predetermined value (for instance, 500 coins). The final prize awarding is carried out based on the outcomes of the common game executed in each gaming machine, and thus the players are given an equal opportunity of being awarded a prize. If the number of times for the predetermined symbol arrangement state has reached the second predetermined value set in advance (for instance, 50 times), a prize having a predetermined value (for instance, a future game) can be awarded. At the same time, the insurance BET number thus accumulated as insurance is cleared, making it possible to provide a game in which the decision as to the use of the insurance function is left with the player.

According to a second aspect of the present invention, there is provided a game system having the following configuration. The game system according to the first aspect further includes a central display device capable of communication with the plurality of gaming machines. The controller displays and executes, on the central display device, at the itemized (h), a common game which is shared among the at least two or more gaming machines of the plurality of gaming machines.

According to the second aspect of the present invention, the common game executed in common among the plurality of gaming machines is displayed on the central display capable of communicating with each gaming machine. Thus, a visually shared display can be provided for the players.

According to a third aspect of the present invention, there is provided a game system having the following configuration. The game system includes (a) a plurality of gaming machines capable of communicating with each other via a communication line. The plurality of gaming machines each have a display device onto which a plurality of types of symbols are arranged; an input device operable to input an insurance BET; and at least one memory; and (b) a central controller capable of communicating with the plurality of gaming machines. The plurality of gaming machines is configured to processing (a-1) to (a-11), and the central controller is configured to processing (b-1) to (b-6) as follows: (a-1) the plurality of gaming machines store a first predetermined value and a second predetermined value in the memory; (a-2) the plurality of gaming machines accept an insurance BET input from the input device; (a-3) the plurality of gaming machines count the insurance BET thus accepted in an accumulative manner, and store the insurance BET number thus counted in the memory; (a-4) the plurality of gaming machines transmit the insurance BET stored at the itemized (a-3) to the central controller; (b-1) the central controller receives the insurance BET transmitted from the plurality of gaming machines at the itemized (a-4); (a-5) the plurality of gaming machines automatically re-arrange the plurality of types of symbols arranged on the display device; (a-6) the plurality of gaming machines judge whether a predetermined symbol arrangement state is established on the display device onto which the symbols are re-arranged at the itemized (a-5); (a-7) in a case where it is judged, as a result of the judgment at the itemized (a-6), that the predetermined symbol arrangement state is established, the plurality of gaming machines count the predetermined symbol arrangement state as one count, and store the counted value in the memory; (a-8) as a result of repeating processing from the itemized (a-2) to (a-7), the plurality of gaming machines judge whether the counted value obtained by counting the predetermined symbol arrangement state and stored at the itemized (a-7) reaches the second predetermined value stored at the itemized (a-1); (a-9) in a case where it is judged, as a result of the judgment at the itemized (a-8) that the counted value reaches the second predetermined value, the plurality of gaming machines award a prize of a predetermined value, and reset the insurance BET number stored at the itemized (a-3) to a default value; (a-10) as a result of repeating processing from the itemized (a-2) to (a-9), the plurality of gaming machines judge whether the insurance BET number stored accumulatively at the itemized (a-3) reaches the first predetermined value stored at the itemized (a-1); (a-11) in a case where it is judged, as a result of the judgment at the itemized (a-10), that the insurance BET number reaches the first predetermined value, at least one or more gaming machines of the plurality of gaming machines transmit the judgment result information to the central controller; (b-2) the central controller receives the judgment result information at the itemized (a-11) from the at least one or more gaming machines; (b-3) the central controller judges whether the judgment result information at the itemized (b-2) is received from the at least two or more gaming machines; (b-4) if it is judged, as a result of the judgment at the itemized (b-3) that the judgment result information is received, the central controller sums up respective insurance BET numbers received at the itemized (b-1) from the at least two or more gaming machines, which have received the judgment result information; (b-5) the central controller transmits information concerning a common game shared among the at least two or more gaming machines to the at least two or more gaming machines; (a-11) the at least two or more gaming machines receives the information concerning the common game from the central controller; (b-6) the central controller transmits information for awarding a prize to a specific gaming machine from the at least two or more gaming machines, based on the outcome of the common game, the prize including a total insurance BET number of the summing-up result at the itemized (b-4).

According to the third aspect of the present invention, even if the number of times for the predetermined symbol arrangement state fails to reach the second predetermined value set in advance (for instance, 50 coins) and a prize having a predetermined value (for instance, a future game) fails to be won, in a case where the insurance BET number invested, as insurance, in the plurality of game machines has reached the first predetermined value (for instance, 500 coins), a specific gaming machine can award a prize including a value obtained by summing up the insurance BET number (for instance, 1600 coins) accumulated in each gaming machine. Thus, a prize can be reliably provided, as insurance, to any of the plurality of gaming machines at which the invested insurance BET number has reached the first predetermined value (for instance, 500 coins). The final prize awarding is carried out based on the outcomes of the common game executed in each gaming machine, and thus the players are given an equal opportunity of being awarded a prize. If the number of times for the predetermined symbol arrangement state has reached the second predetermined value set in advance (for instance, 50 times), a prize having a predetermined value (for instance, a future game) can be awarded. At the same time, the insurance BET number accumulated as insurance is cleared, making it possible to provide a game in which the decision as to the use of the insurance function is left with the player. The central controller and the gaming machines communicate with each other to execute a game. The gaming machines can thus all be managed at the central controller side, preventing fraudulent acts and the like.

According to a fourth aspect of the present invention, there is provided a game system having the following configuration. The game system according to the third aspect further includes a central display device connected so as to allow communication with the central controller, and operable to display a predetermined picture. The central controller transmits, at the itemized (b-5), information concerning the common game to the at least two or more gaming machines, and displays and executes the common game on the central display device.

According to the fourth aspect of the present invention, the common game executed in common in the plurality of gaming machines is displayed on the central display capable of communicating with each gaming machine. Thus, a display which is visually shared by the players can be provided.

According to a fifth aspect of the present invention, there is provided a controlling method of a game system having the following configuration. The game system includes a plurality of gaming machines capable of communicating with each other via a communication line. The plurality of gaming machines each have a display device onto which a plurality of types of symbols are arranged, an input device operable to input an insurance BET, at least one memory, and a controller. The controlling method includes the steps of: the controller storing at least one predetermined value in the memory; the controller accepting the insurance BET input from the input device; (c) the controller counting the insurance BET thus accepted in an accumulative manner and storing the counted insurance BET number in the memory; (d) the controller automatically re-arranging the plurality of types of symbols arranged on the display device; (e) as a result of repeating the steps at the itemized (b) to (d), the controller judging whether the insurance BET number stored accumulatively at the itemized (c) reaches the predetermined value stored at the itemized (a); (f) if it is judged, as a result of the judgment at the itemized (e), that the insurance BET number stored accumulatively at the itemized (c) reaches the predetermined value stored at the itemized (a), the controller judging whether a same result as the judgment result is obtained by at least two or more gaming machines from among the plurality of gaming machines; (g) if it is judged, as a result of the judgment at the itemized (f), that the insurance BET number of the at least two or more gaming machines from among the plurality of gaming machines stored accumulatively reaches the predetermined value, the controller summing up the insurance BET number of the at least two or more gaming machines from among the plurality of gaming machines stored at the itemized (c), and storing a total insurance BET number of the summing-up result, in the memory; (h) the controller executing a common game shared among the at least two or more gaming machines from among the plurality of gaming machines; and (i) the controller awarding a prize to a specific gaming machine from the at least two or more gaming machines from among the plurality of gaming machines, based on an outcome of the executed common game, the prize including the total insurance BET number stored at the itemized (g).

According to the fifth aspect of the present invention, in a case where the insurance BET number invested, as insurance, in the plurality of game machines has reached the first predetermined value (for instance, 500 coins), a specific gaming machine can award a prize including a value obtained by summing up the insurance BET number (for instance, 1600 coins) accumulated in each gaming machine. Thus, a prize can be reliably provided, as insurance, to any of the plurality of gaming machines at which the invested insurance BET number has reached the first predetermined value (for instance, 500 coins). The final prize awarding is carried out based on the outcomes of the common game executed in each gaming machine, and thus the players can be given an equal opportunity of being awarded a prize.

According to a sixth aspect of the present invention, there is provided a controlling method of a game system having the following configuration. In the game system according to aspect 5, the controller, at the itemized (a), sets the predetermined value to a first predetermined value, and further stores a second predetermined value in the memory, the second predetermined value being different from the first predetermined value. The itemized (d) further includes the steps of: (d-1) the controller automatically re-arranging the plurality of types of symbols which have been arranged on the display device; (d-2) the controller judging whether a predetermined symbol arrangement state is established on the display device onto which the symbols are re-arranged; (d-3) if it is judged, as a result of the judgment, that the predetermined symbol arrangement state has been established, the controller counting the predetermined symbol arrangement state as one count, and storing the counted value; (d-4) as a result of repeating steps at the itemized (b) to (d-3), the controller judging whether the counted value obtained by counting the predetermined symbol arrangement state stored at the itemized (d-3) has reached the second predetermined value stored at the itemized (a); and (d-5) if it is judged, as a result of the judgment, that the counted value has reached the second predetermined value, the controller awarding a prize having a predetermined value, and, resetting the insurance BET number accumulatively stored at the itemized (c) to a default value.

According to the sixth aspect of the present invention, even if the number of times for the predetermined symbol arrangement state fails to reach the second predetermined value set in advance (for instance, 50 coins) and a prize having a predetermined value (for instance, a future game) fails to be won, a prize can be reliably provided, as insurance, to any of the plurality of gaming machines at which the invested insurance BET number has reached the first predetermined value (for instance, 500 coins). If the number of times for the predetermined symbol arrangement state has reached the second predetermined value set in advance (for instance, 50 times), a prize having a predetermined value (for instance, a future game) can be awarded. At the same time, the insurance BET number accumulated as insurance is cleared, making it possible to provide a game in which the decision as to the use of the insurance function is left with the player.

According to a seventh aspect of the present invention, there is provided a controlling method of a game system having the following configuration. In the controlling method of the game system according to claim 5, the controller, at the itemized (h), displays and executes a common game shared among the at least two or more gaming machines among from the plurality of gaming machines, on a central display device capable of communicating with the plurality of gaming machines.

According to the seventh aspect of the present invention, the common game executed in common among the plurality of gaming machines is displayed on the central display which is capable of communicating with the gaming machines. Thus, a display which is visually shared by the players can be provided.

According to the present invention, it is possible to provide a game system and a controlling method thereof in which an insurance function is shared among a plurality of gaming machines, making it possible to additionally offer new entertainability to the players.

BRIEF DESCRIPTION OF THE DRAWINGS

FIG. 4 is a view for explaining a symbol arrangement table;

FIG. 5 is a view for explaining a scatter prize award table;

DESCRIPTION OF THE PREFERRED EMBODIMENTS

Figure 1:
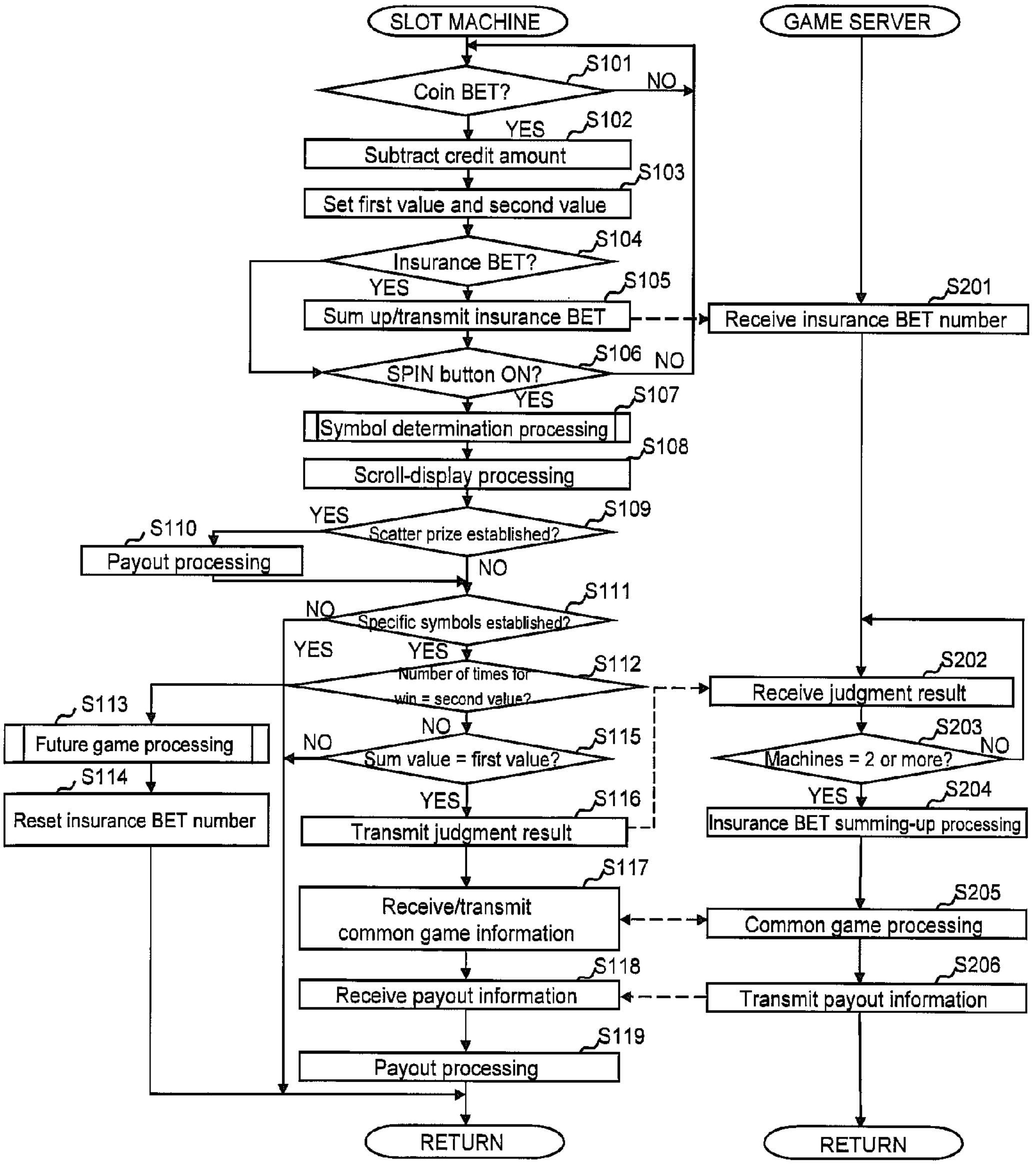
FIG. 1 is a flowchart showing a subroutine of Link game processing.

Hereinafter, one embodiment of a game system and a controlling method thereof, according to the present invention, will be described with referring to the drawings.

When a player makes a request to enter a Link game, a game system 100 according to the present embodiment establishes a communication connection between a plurality of slot machines 10 and a game server 200 to start Link game processing, as shown in FIG. 1. The Link game is a game in which a player is saved if he/she cannot win a future game even after playing a game by a predetermined number of times in a plurality of slot machines which have entered the Link game. In this game, the players at the respective slot machines compete for a coin payout corresponding to a total sum value of the insurance BET number which has been accumulated on a game-by-game basis as insurance.

A main CPU 41 provided in each of the slot machines 10 executes the following processing. At step S103, the main CPU 41 stores, in a RAM 43, a first value (for instance, 500 coins) as a predetermined accumulated value of an insurance bet, and a second value (for instance, 50 times) as predetermined accumulated number of times for a BONUS win. Aside from accepting a BET for a game start at step S101, the main CPU 41 also accepts an insurance BET at step S104, as insurance, the insurance BET being input by depression of an INSURANCE BET button 90. At step S105, the main CPU counts the accepted insurance BET for accumulation and at the same time, stores the counted value in the RAM 43. Then, the main CPU transmits the counted insurance BET information to the game server 200. A main CPU 201 in the game server 200 receives the insurance BET information from each slot machine 10 at step S201.

The main CPU 41 in each of the slot machines 10 executes the following processing. At step S108, the main CPU 41 automatically rearranges a plurality of types of symbols arranged on display blocks 28 in a lower image display panel 16. At step S109 and step S111, the main CPU 41 judges whether or not any of the display blocks 28 in which the symbols have been rearranged displays three or more trigger symbols for the scatter prize in a stopped state, and a scatter prize is established; or alternatively, whether or not any of the above-mentioned display blocks 28 displays three or more trigger symbols for the BONUS in a stopped state, and a BONUS prize is established. In a case where it is judged, as a result of the judgment, that a scatter prize has been established, the main CPU 41 pays out, at step S110, a predetermined number of coins in accordance with the number of displayed symbols. In a case where it is judged, as a result of the judgment, that the BONUS win has been established, the main CPU 41 counts, at step S112, the BONUS win as one count and at the same time, stores the counted number of times in the RAM 43. As a result of repeating the game, if the number of times for the BONUS win, the number being stored in the RAM 43, reaches the second value (for instance, 50 times) which has been stored in advance in the RAM 43 at step S103, "BONUS IN" is set. If "BONUS IN" is set, the main CPU 41 awards a future game, as a prize, to the player at step S113 and at the same time, resets the insurance BET number stored in the RAM 43 to "0" at step S114.

The main CPU 41 in the slot machines 10 further executes the following processing. As a result of repeating the game described above, in a case where a BONUS win fails to be established and a future game is not won, the main CPU 41 judges, at step S115, whether or not the insurance BET number which has been accumulatively stored reaches the first value stored in advance in the RAM 43 at step S103 (for instance, 500 coins). If the main CPU 41 judges, as a result of the judgment, that the insurance BET number reaches the first value, it transmits such judgment result information to the game server 200, at step S116.

The CPU 201 in the game server 200 executes the following processing. At step S202, the CPU 201 receives the judgment result information transmitted from the slot machines 10. At step S203, the CPU 201 judges whether or not the judgment result information is received from at least two or more slot machines 10. If the judgment result is affirmative, the CPU 201 sums up the respective insurance BET number for the at least two or more slot machines 10 from which the judgment result information was received (step S204). At step S205, the CPU 201 executes a common game which is shared amongst the two or more slot machines 10, on a common display 300, for instance. Information concerning the common game is transmitted to each slot machine 10. At step S117, the slot machine 10 carries out transmission and reception of information concerning the common game with the game server 202. In the common game, a free game is carried out by a predetermined number of times among a plurality of slot machines 10, and a prize is awarded to the slot machine 10 at which the number of times for the BONUS win has first reached the second value stored in the RAM 43 at step S103 (for instance, 50 times).

The CPU 201 of the game server 200 transmits, at step S206, information concerning a prize award, inclusive of the total insurance BET number which was summed up in the previous processing, to a specified slot machine 10 from the two or more slot machines 10, based on the outcomes of the common game. At step S119, the slot machine 10 executes payout of a predetermined number of coins corresponding to the total insurance BET number which was summed up based on the received information.

Figure 2:
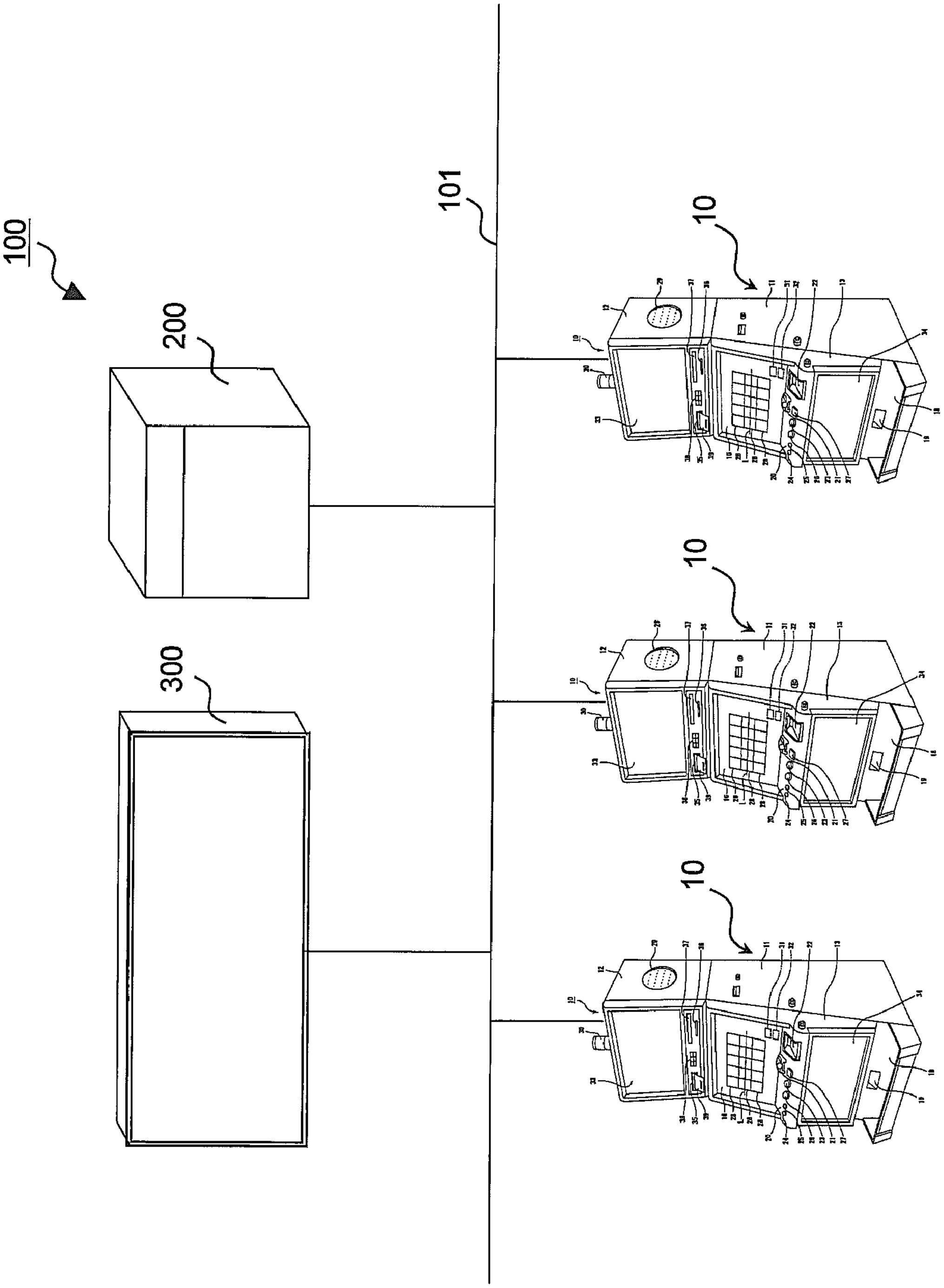
FIG. 2 is a schematic view showing an overall configuration of a game system.

Next, an overall configuration of the game system 100 according to the present embodiment will be described. FIG. 2 is a schematic view showing the overall configuration of the game system. As shown in FIG. 2, the game system 100 has a plurality of slot machines 10, a game server 200 and a common display 300.

The plurality of slot machines 10 and the common display 300 are connected to the game server 200 via a communication line 101. The slot machines 10 and the common display 300 can carry out data transmission and reception with the game server 200 via the communication line 101. The slot machines 10 are connected to each other so as to enable communication therebetween via the communication line 101.

The common display 300 is intended to display a common game which is played among the plurality of slot machines 10 when the Link game to be described later has been executed. The common display is installed at a position where it can be seen by the players at the slot machines 10.

In the present embodiment, a description will be given concerning the case that the plurality of slot machines 10, the game server 200 and the common display 300 are connected in a wired fashion. However, the present invention is not limitative to this example, and data transmission and reception therebetween may also be carried out wirelessly. That is, the communication line according to the present invention includes a wired, as well as a wireless transmission path. In the present embodiment, a description will be given concerning the case that the game system 100 is installed in one gaming arcade, etc. However, in the present invention, each slot machine 10 may be installed in separate gaming arcades.

Figure 3:
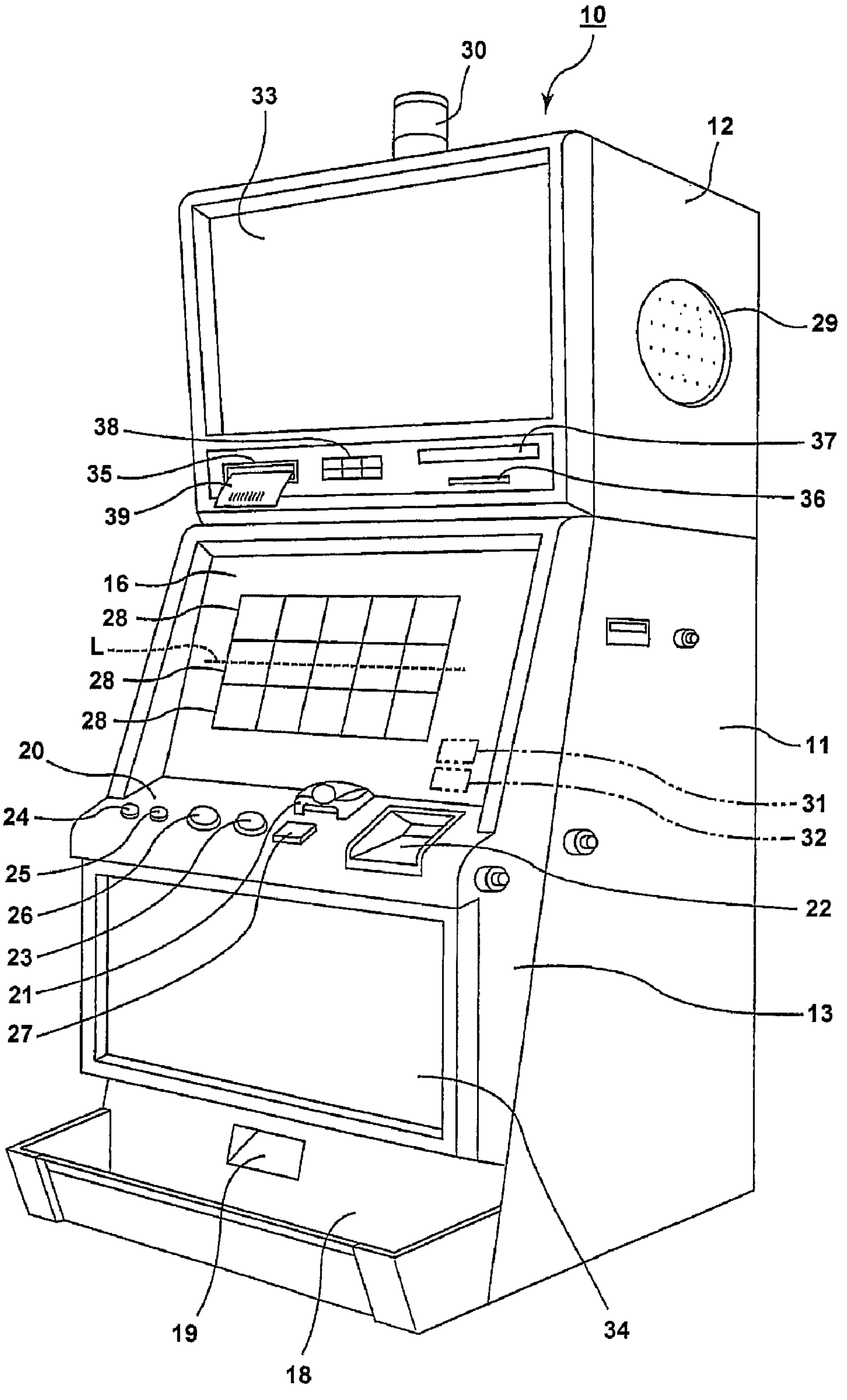
FIG. 3 is a perspective view showing an appearance of a slot machine.

Next, the configuration of each sot machine 10 according to the present embodiment will be described using FIG. 3. The slot machine to be described here is a video-type slot machine, but the present invention is also applicable to a mechanical reel-type slot machine.

Generally, a slot machine 10 executes a Sand-Alone game in which it operates independently from the other slot machines 10. In accordance with a selection request from the player, the slot machine 10 also executes a Link game in cooperation with the other slot machines 10, via the game server 200.

In the slot machine 10, coins, bills or electronic valid information equivalent thereto are employed as gaming media. In the present invention, however, the gaming media are not limitative thereto in particular, and can include medals, tokens, electric money, and tickets, for example. The above tickets are not limitative thereto in particular, and can include bar code-attached tickets or the like, as described later, for example.

The slot machine 10 is provided with: a cabinet 11; a top box 12 installed at the upper side of the cabinet 11; and a main door 13 provided at the front face of the cabinet 11.

In front of the main door 13, a lower image display panel 16 is provided as a display device. The lower image display panel 16 is provided with a transparent liquid crystal display panel, and 15 display blocks 28 (28*a* to 28*o*) of 5 columns and 3 rows are displayed. One symbol is displayed in each of the display blocks 28. The lower image display panel 16 is equivalent to the display device according to the present invention.

In addition, a credit amount display portion 31 and a payout number display portion 32 are set on the lower image display panel 16. At the credit amount display portion 31, the number of credited coins is displayed by way of image. At the payout display portion 32, the number of coins paid out in a case where symbols of the same type are displayed in a stopped state by a predetermined number or more in the display blocks 28, is displayed by way of image.

Further, on the front face of the lower image display panel 16, a touch panel 69 is provided, so that a player can enter various instructions by operating the touch panel 69.

Provided downwardly of the lower image display panel 16 are: a control panel 20 made of a plurality of buttons 23 to 27 for a player to input instructions associated with the progress of a game; a coin insertion slot for accepting coins in the cabinet 11; and a bill validator 22.

On the control panel 20, a SPIN button 23, a CHANGE button 24, a CASHOUT button 25, a 1-BET button 26, a MAX-BET button 27 and an INSURANCE BET button 90 are provided. The SPIN button 23 is intended to enter an instruction for starting scroll-display of symbols. The CHANGE button 24 is employed when a player requests the attendant in game facility to change money. The CASHOUT button 25 is intended to enter an instruction for paying out credited coins to a coin tray 18.

The 1-BET button 26 is intended to enter an instruction for betting one coin on a game from among the credited coins. The MAX-BET button 27 is intended to enter an instruction for betting the maximum number of coins (50 coins in the present embodiment) that can be betted in one game. The 1-BET button 26 and the MAX-BET button 27 are equivalent to the BET button for the game start.

The INSURANCE BET button 90 is intended to enter an instruction for betting a predetermined number of coins (for instance, 10 coins) as insurance, from among the credited coins. The insurance bet placed with the use of the INSURANCE BET button 90 is placed randomly by the player, unlike the BET buttons 26 and 27 for the game start. In the Stand-Alone game, if the insurance BET number invested on a game-by-game basis reaches the second value set in advance (for instance, 500 coins), a predetermined number of coins (for instance, 150 coins) will be paid out as insurance. In the Link game, if the insurance BET number invested on a game-by-game basis reaches the second value set in advance (for instance, 500 coins), in the slot machines 10 that have entered the Link game, coins corresponding to the total value (for instance, 1600 coins) of the insurance BET number invested in the slot machines 10 will be paid out to a predetermined slot machine 10. The INSURANCE BET button 90 is equivalent to an input device according to the present invention.

The insertion of gaming media denotes that gaming media are betted on games. For example, in a case where the coins inserted into the coin insertion slot 21 are directly betted on games, coin insertion into the coin insertion slot 21 is equivalent to insertion of gaming media. Specifically, if coins are inserted into the coin insertion slot 21, they are temporarily credited. When the 1-BET button 26 and the MAX-BET button 27 are operated, the credited coins are betted on games. In this case, the fact that the credited coins are betted on games is equivalent to insertion of gaming media.

The bill validator 22 validates whether or not bills are valid and accepts valid bills in the cabinet 11. The bill validator 22 may be constructed so that bar code-attached tickets 39 described later are readable thereby. Provided on the lower front face of the main door 13, i.e., downwardly of the control panel 20 is a belly glass 34 on which a character or the like of the slot machine 10 is expressed.

An upper image display panel 33 is provided on the front face of the top box 12. The upper image display panel 33 is provided with a liquid crystal display panel, and displays images representative of an introduction to the contents of a game or explanation of game rules. In addition, the upper image display panel 33 displays effect images when a future game or a progressive jackpot is established.

In addition, a speaker 29 is provided at the top box 12. At the lower side of the upper image display panel 33, a ticket printer 35, a card reader 36, a data display 37, and a keypad 38 are provided. The ticket printer 35 prints, on tickets, bar codes having coded therein a variety of data including credit number, date and time, and identification number of slot machine 10. The printed tickets are output as bar code-attached tickets 39. A player causes another slot machine to read the bar code-attached tickets 39, allowing the slot machine to perform games, or alternatively, allowing the exchange of bar code-attached tickets 39 with bills or the like at a predetermined site of a game facility (for example, at the cashier in a casino).

The card reader 36 is intended to read and write data from/into a smart card. The smart card is a player-owned card, and stores data for recognizing the player and data concerning the log of games that were performed by the player. The smart card may store data equivalent to coins, bills, or credits. In addition, a magnetic stripe card may be employed in place of the smart card. A data display 37 is made up of a fluorescent display or the like, and displays the data read by the card reader 36 and the data input by the player via the keypad 38, for example. The keypad 38 is intended to input the instructions and data concerning the issuance of tickets or the like.

FIG. 4 is a view for explaining a symbol arrangement table. As shown in FIG. 4, in display blocks 28, the columns of a total of 22 symbols made up of code numbers 00 to 21 are displayed in a scrolled manner. The column of symbols is constituted while symbols "EARTH", "JUPITER", "SATURN", "SUN", "VENUS", "MARS", "MERCURY", "K", "J", "Q", and "A" are combined with each other. These symbols are all scatter symbols.

Figure 7:
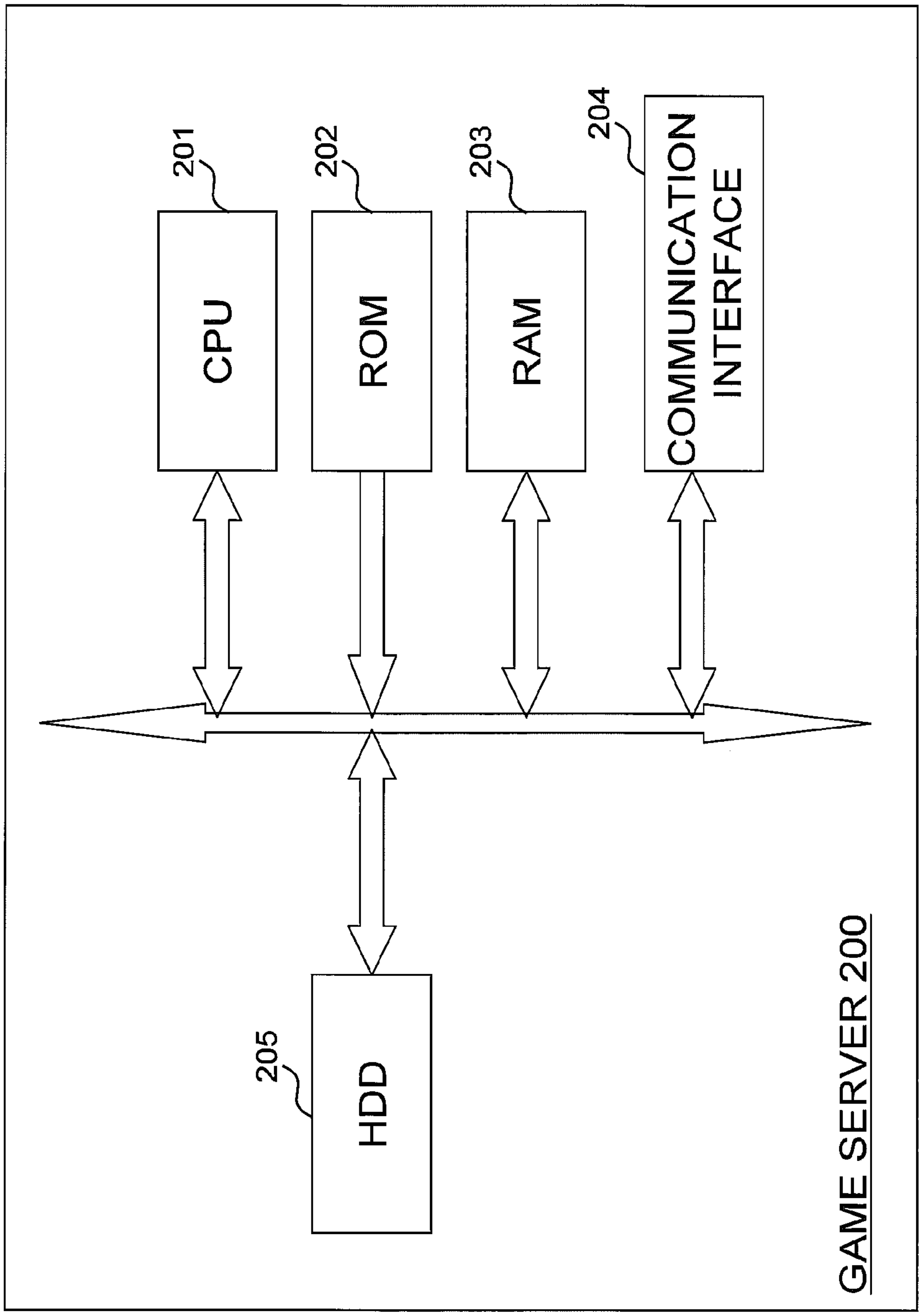
FIG. 7 is a block diagram depicting an internal configuration of a game server.

FIG. 5 is a view for explaining a scatter prize. The symbols "JUPITER", "SATURN", "SUN", "VENUS", "MARS", "MERCURY", "K", "J", "Q", and "A" are trigger symbols for the scatter prize. Among these symbols, in a case where three or more symbols of the same type are displayed (rearranged) in a stopped state in any of the display blocks 28 of the lower image display panel 16, a predetermined number of coins are paid out as the scatter prize corresponding to the types and number of symbols and BET number. The payout of coins is performed based upon FIG. 5. For example, as shown in FIG. 7, if three "JUPITER" symbols are displayed in a stopped state in any of the display blocks 28, 70 coins are paid out; if four "JUPITER" symbols are displayed in a stopped state, 140 coins are paid out; and if five "JUPITER" symbols are displayed in a stopped state, 280 coins are paid out (these coin payout numbers are calculated for one coin entry).

Hereinafter, the "EARTH" symbol will be described. "EARTH" is a trigger symbol for BONUS. If three or more "EARTH" symbols are displayed (re-arranged) in a stopped state in any of the display blocks 28 of the lower image display panel 16, a BONUS win is established. If the BONUS win is established on a game-by-game basis, the number of times for the BONUS win is counted, and the counted number value is stored in the RAM 43. If the number of times for the BONUS win, which is being counted, reaches the second value (for instance, 50 wins) stored in the RAM 43, as a result of repeating the game, "BONUS IN" is set, and a future game is executed.

In the future game, a free game is executed by a predetermined number of times that was determined based upon the random number value obtained by executing a random number generation program included in the symbol determination programs. The free game is a game which the player can perform without betting coins.

Figure 6:
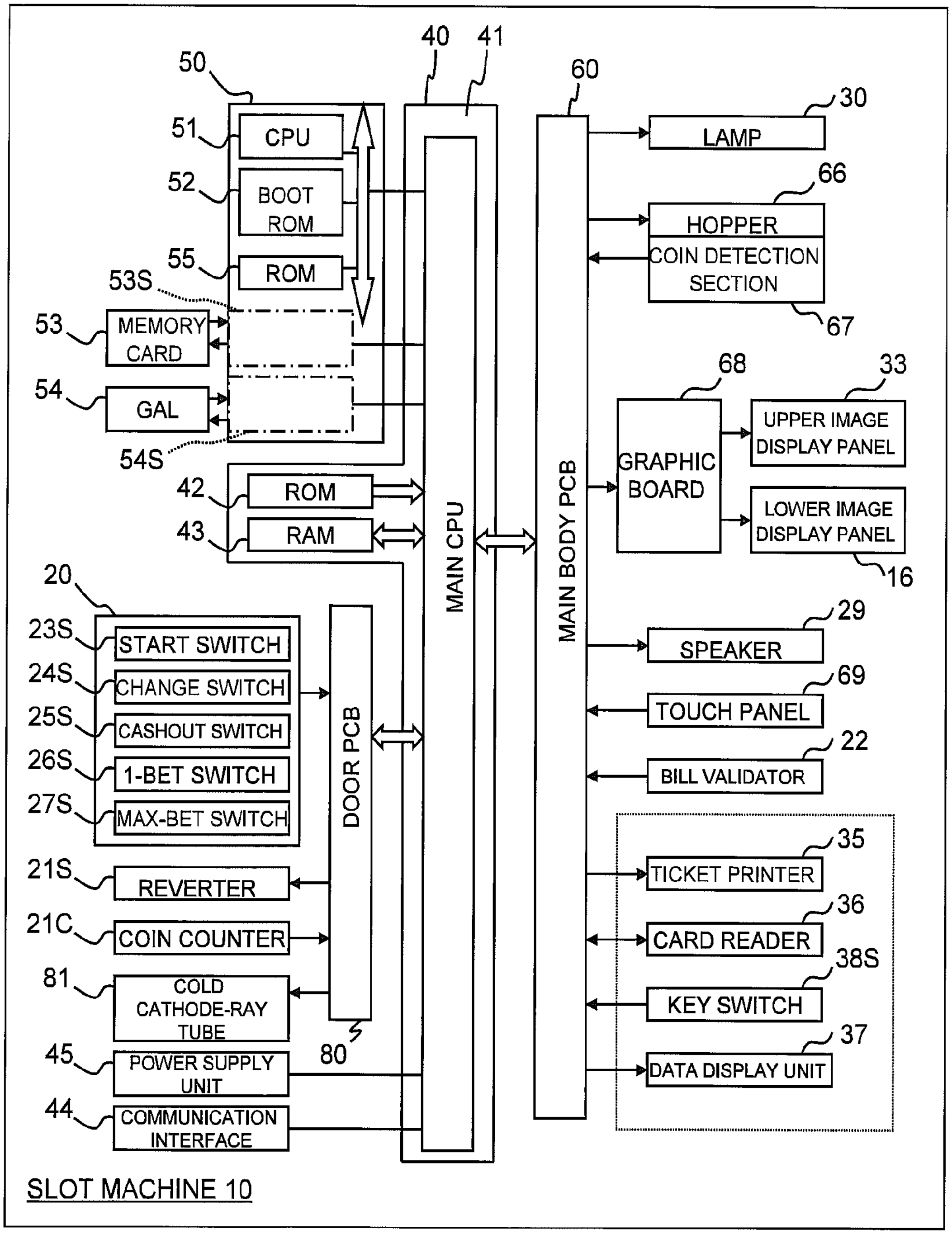
FIG. 6 is a block diagram depicting an internal configuration of the slot machine.

FIG. 6 is a block diagram depicting an internal configuration of a slot machine. A gaming board 50 is provided with: a CPU (Central Processing Unit) 51, a ROM55, and a boot ROM52, which are interconnected via an internal bus; a card slot 53S compatible with a memory card 53; and an IC socket 54S compatible with a GAL (Generic Array Logic) 54.

The memory card 53 is made up of non-volatile memories such as CompactFlash (registered trademark), and stores game programs. The game programs contain a symbol determination program. The symbol determination program is intended for determining symbols (code Nos. corresponding to the symbols shown in FIG. 4) which are displayed in a stopped state along the payline L.

The card slot 53S is constituted such that the memory card 53 can be inserted into or drawn out from, and is connected to a motherboard 40 through an IDE bus. Therefore, the types or contents of games played in the slot machine 10 can be changed by removing the memory card 53 from the card slot 53S, writing different game programs into the memory card 53, and then, inserting the memory card 53 into the card slot 53S. The game programs include those related to the progress of a game. The game programs further include: image data and sound data output at the time of the play of a game.

The CPU51, the ROM55, and the boot ROM52 interconnected via the internal bus are connected to the motherboard 40 via a PCI bus. The PCI bus not only performs signal transmission between the motherboard 40 and the gaming board 50, but also supplies power from the motherboard 40 to the gaming board 50.

The motherboard 40 is made up of a commercially available general-purpose motherboard (a printed circuit board on which the essential parts of a personal computer are mounted). This motherboard includes: a main CPU 41; a ROM (Read Only Memory) 42; a RAM (Random Access Memory) 43; and a communication interface (not shown). The main CPU 41 functions as the controller of the present invention. The RAM 43 is equivalent to the memory according to the present invention.

The ROM 42 is made up of a memory device such as a flash memory, and stores a program such as a BIOS (Basic Input/Output System) executed by the main CPU 41 and permanent data. When the main CPU 41 executes the BIOS, initialization processing is performed for predetermined peripheral devices, and capture processing of the game program stored on the memory card 53 is also started via the gaming board 50. In the present invention, the contents of the ROM 42 may be rewritable or not. In the present embodiment, the ROM 42 stores the symbol arrangement table shown in FIG. 4 and the scatter prize award table shown in FIG. 5, for instance.

The RAM 43 stores data and programs employed when the main CPU 41 is activated. In addition, the RAM 43 can store game programs. In the present embodiment, the RAM 43 stores, for instance, the insurance BET number, the BET number for game start, the number of times for the BONUS win, the progressive value, the number of symbols, the number of credits, coin entry number and payout number in one game, and data received from the game server 200. The RAM 43 also stores the first value and the second value. The first value is a predetermined accumulated value (for instance, 500) for the insurance BET consumed on a game-by-game basis. The second value is a predetermined number of times (for instance, 50) for the BONUS win.

Both a body PCB (Printed Circuit Board) 60 and a door PCB 80, which will be described later, are connected to the motherboard 40 by the USB. Further, a power source unit 45 and a communication interface 44 are also connected to the motherboard 40.

Equipment and devices, which generate input signals to be input to the main CPU 41, and equipment and devices, the operations of which are controlled by a control signal output from the main CPU 41, are connected to the body PCB 60 and the door PCB 80. The main CPU 41 executes the game programs stored in RAM 43, based upon an input signal that was input to the main CPU 41, thereby performing predetermined computational processing. Then, this CPU 41 stores results of the processing into RAM 43; and transmits control signals to equipment and devices as control processing relative to the equipment and devices.

A lamp 30, a hopper 66, a coin detecting section 67, a graphic board 68, a speaker 29, a touch panel 69, a bill validator 22, a ticket printer 35, a card reader 36, a key switch 38S and a data display 37, are connected to the body PCB 60. The lamp 30 is lit up in a predetermined pattern, based upon a control signal output from the main CPU 41.

The hopper 66 is installed in the cabinet 11. This hopper pays out a predetermined number of coins from a coin payout exit 19 to a coin tray 18, based upon a control signal output from the main CPU 41. A coin detecting section 67 is installed inside the coin payout exit 19. This detecting section outputs an input signal to the main CPU 41 at the time of detecting that a predetermined number of coins have been paid out from the coin payout exit 19.

The graphic board 68 performs control, based upon a control signal output from the main CPU 41. This graphic board displays images on the upper image display panel 33 and the lower image display panel 16 that serves as an output device. The activated paylines randomly determined through selection of random numbers are displayed, and also, symbols determined through selection of random number are displayed in a scrolled or stopped state, in the respective display blocks 28 on the lower image display panel 16. The number-of-credits display section 31 on the lower image display panel 16 displays the number of credits stored in the RAM 43. Further, the number-of-payouts display section 32 on the lower image display panel 16 displays the number of coins to be paid out. The graphic board 68 is equipped with: a VDP (Video Display Processor), which generates image data based upon a control signal output from the main CPU 41; and a video RAM, which temporarily stores image data generated by the VDP or the like. The image data used in generating image data with VDP is read from the memory card 53. The read image data is contained in the game programs stored in the RAM 43.

The bill validator 22 not only discriminates a valid bill from an invalid bill, but also accepts the valid bill into the cabinet 11. At the time of accepting a valid bill, the bill validator 22 outputs an input signal to the main CPU 41 based upon a face amount of the bill. The main CPU 41 stores the number of credits corresponding to the face amount of the bill transmitted with the input signal.

The ticket printer 35, based upon a control signal output from the main CPU 41, prints on a ticket a bar code obtained by encoding data such as the number of credits, date and time, and the identification number of the slot machine 10 stored in the RAM 43. The printed bar-code ticket is output as the bar code-attached ticket 39. The card reader 36 transmits, to the main CPU 41, the data read from the smart card, and writes the read data onto the smart card, based upon a control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by the card reader 36 and the data input by a player through the key pad 38.

The control panel 20, a reverter 21S, a coin counter 21C, and a cold cathode-ray tube 81 are connected to the door PCB 80. The control panel 20 is provided with: a SPIN switch 23S corresponding to the SPIN button 23; a CHANGE switch 24S corresponding to the CHANGE button 24; a CASHOUT switch 25S corresponding to the CASHOUT button 25; a 1-BET switch 26S corresponding to the 1-BET button 26; a MAX-BET switch 27S corresponding to the MAX-BET button 27 and an INSURANCE BET switch 90S corresponding to the INSURANCE BET button 90. When a player operates the buttons 23 to 27, the switches 23S to 27S corresponding thereto output input-signals to the main CPU 41, respectively.

The coin counter 21C is installed inside the coin receiving slot 21. This coin counter discriminates whether a coin inserted by a player into the coin receiving slot 21 is valid or invalid. Those other than the valid coins are discharged from the coin payout exit 19. The coin counter 21C also outputs an input signal to the main CPU 41 if a valid coin is detected.

The reverter 21S operates based upon a control signal output from the main CPU 41 and distributes valid coins recognized by the coin counter 21C into a cash box (not shown) or the hopper 66, which is disposed in the slot machine 10. In other words, when the hopper 66 is filled with coins, valid coins are distributed into the cash box. On the other hand, when the hopper 66 is not filled with coins, valid coins are distributed into the hopper 66. The cold cathode-ray tube 81 works as a backlight installed on the back face side of each of the lower image display panel 16 and the upper image display panel 33. This backlight is lit up based upon a control signal output from the main CPU 41.

FIG. 7 is a block diagram showing an internal configuration of the game server. As shown in FIG. 7 the game server 200 has a CPU 201, a ROM 202, a RAM 203, a communication interface 204 and an HDD (Hard Disk Drive) 205, as a memory. The communication interface 204 is connected to the common display 300 and the communication interface 44 for each slot machine 10 via the communication line 101. The ROM 202 stores a system program for controlling the operation of the CPU 201 and permanent data. The RAM 203 temporarily stores data received from each slot machine 10. The HDD 205 collects, in a cumulative manner, the gaming media on which the insurance BET was placed in the slot machines 10 and at the same time, stores information concerning the number of players in the Link game, payout information concerning the gaming media and information concerning the common game.

Next, processing carried out in the game system 100 will be described with referring to the drawings. The main CPU 41 of the slot machine 10 advances the game by reading and then executing a game program. The CPU 201 of the game server 200 controls the overall game system 100 by reading and executing a predetermined program.

Figure 8:
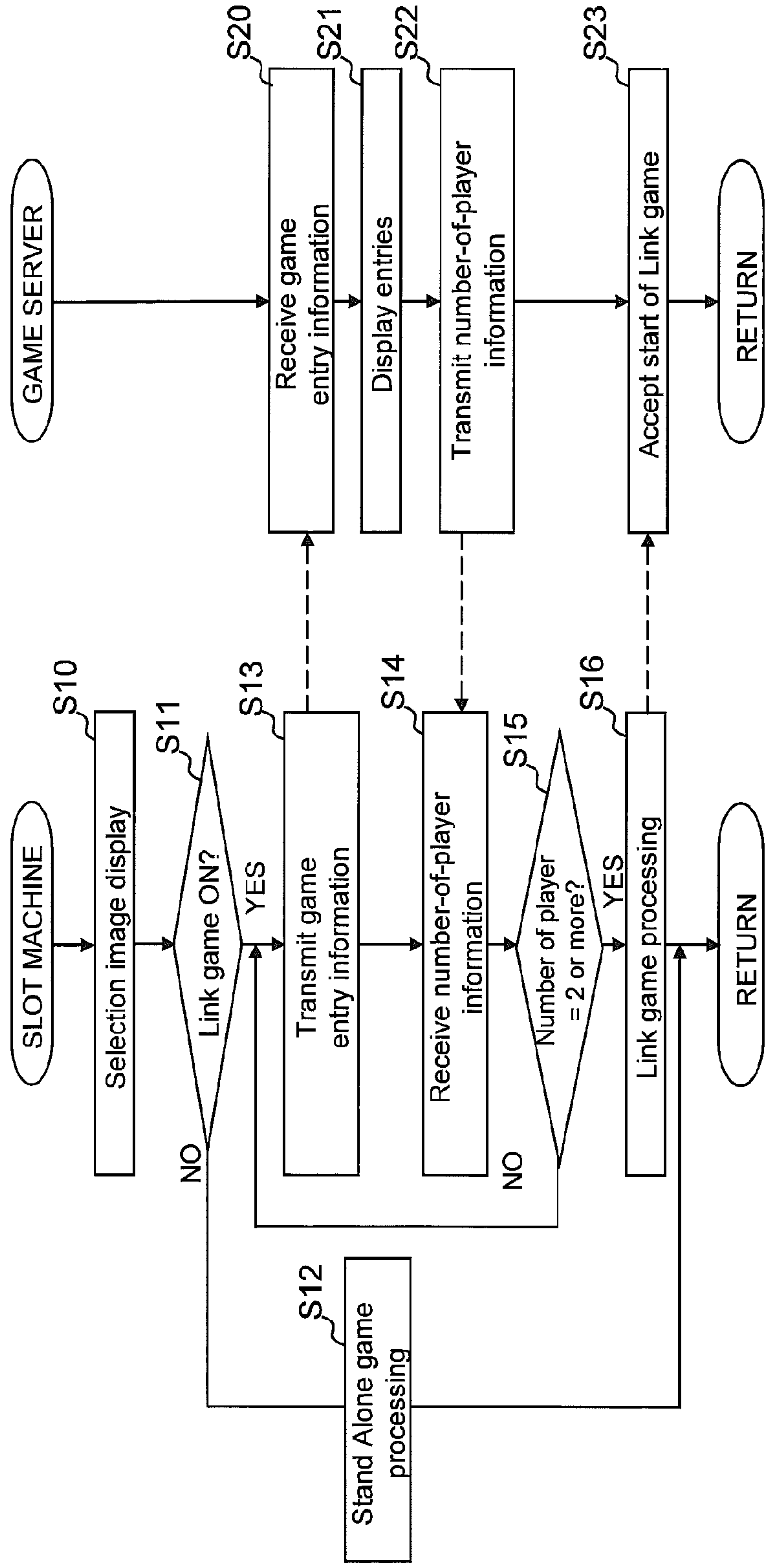
FIG. 8 is a flowchart showing a subroutine of game selection processing.
Figure 9:
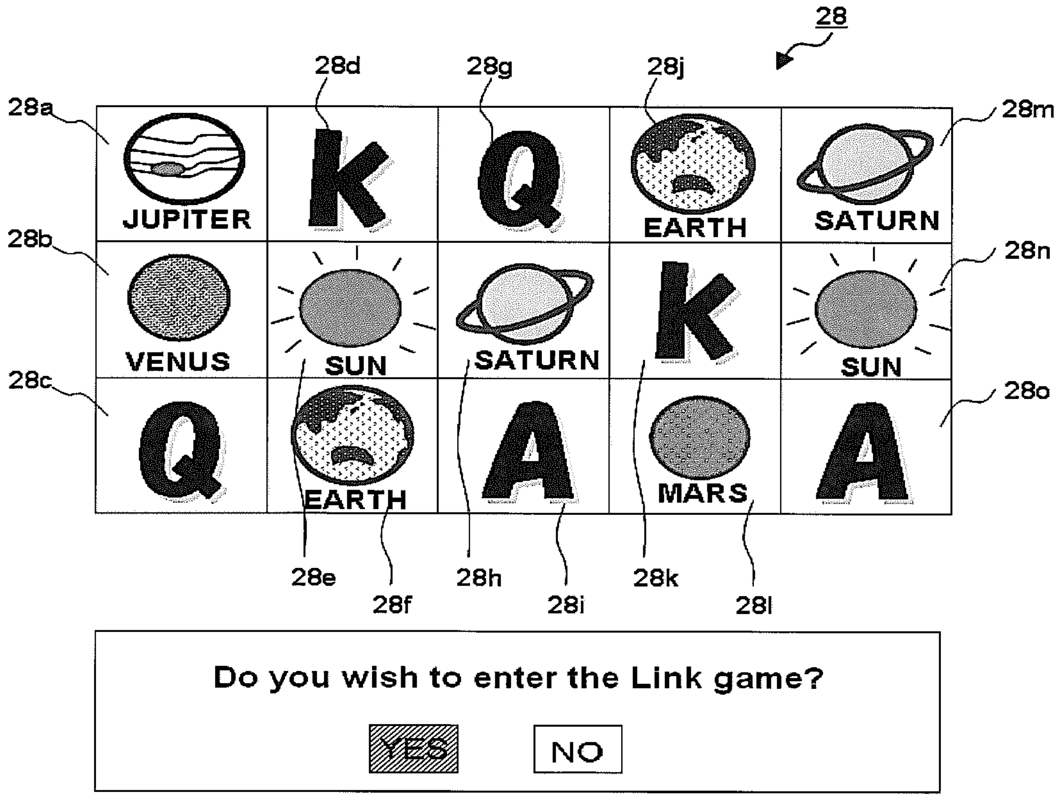
FIG. 9 is a view showing an exemplary display on a display.

The game selection processing will now be described. FIG. 8 is a flowchart showing the subroutine of the game selection processing. FIG. 9 is a view showing an exemplary display on a display. The game selection processing to be described hereinafter is carried out through the cooperation of the main CPU 41 of the slot machine 10 and the CPU 41 of the game server 200.

The main CPU 41 of the slot machine 10 carries out the following processing at steps S10 through S16. At step S10, the main CPU 41 carries out selection screen display processing. More specifically, the main CPU 41 displays, at a lower side of the display block 28, a selection image urging the player to select whether or not he/she will enter the Link game, as shown in FIG. 9. The player inputs the selection on whether or not he/she will enter the Link game by touching arbitrary portions on the touch panel 69. For instance, if the player enters the Link game, he/she will select the selection image corresponding to "YES". If the player continues playing the Stand-Alone game without entering the Link game, he/she will select the selection image corresponding to "NO".

Next, at step S11, the main CPU 41 of the slot machine 10 judges whether or not the player touched the "YES" selection image and selected the Link game at step S10. As a result of the judgment, if the main CPU 41 judges that the Link game was not selected (S11: NO), the routine proceeds to step S12 at which the Stand-Alone game processing is executed. If the main CPU 41 judges that the Link game was selected (S11: YES), the routine proceeds to step S13 at which information concerning entry to the Link game is transmitted to the game server 200.

Next, at step S14, the main CPU 41 of the slot machine 10 receives number-of-player information from the game server 200. At step S15, the main CPU 41 judges whether or not the number of players entering the Link game is two or more, based on the received number-of-player information. If the main CPU 41 judges that the number of players entering the Link game is two or more, the routine proceeds to step S16 at which the Link game processing is carried out and at the same time, start information concerning the Link game processing is transmitted to the game server 200. Alternatively, if the main CPU 41 judges that the number of players entering the game is below 2, the routine reverts to step S13, and the steps S13 through S15 as previously described are repeated.

The CPU 201 of the game server 200 carries out processing at the following steps S20 through S23. At step S20, the CPU 201 receives Link game entry information from the slot machine 10, which information has been transmitted at step S13 described hereinbefore. Next, at step S21, the CPU 201 of the game server 200 displays, on the common display 300, that entry to the Link game is accepted. At the following step S22, the CPU 201 transmits the number-of-player information for the Link game to each slot machine 10. Next, at step S23, the CPU 201 receives the Link game processing start information which was transmitted at the above-mentioned step S16, from the slot machine 10 and at the same time, recognizes the slot machine 10 at which the Link game processing has started.

Figure 10:
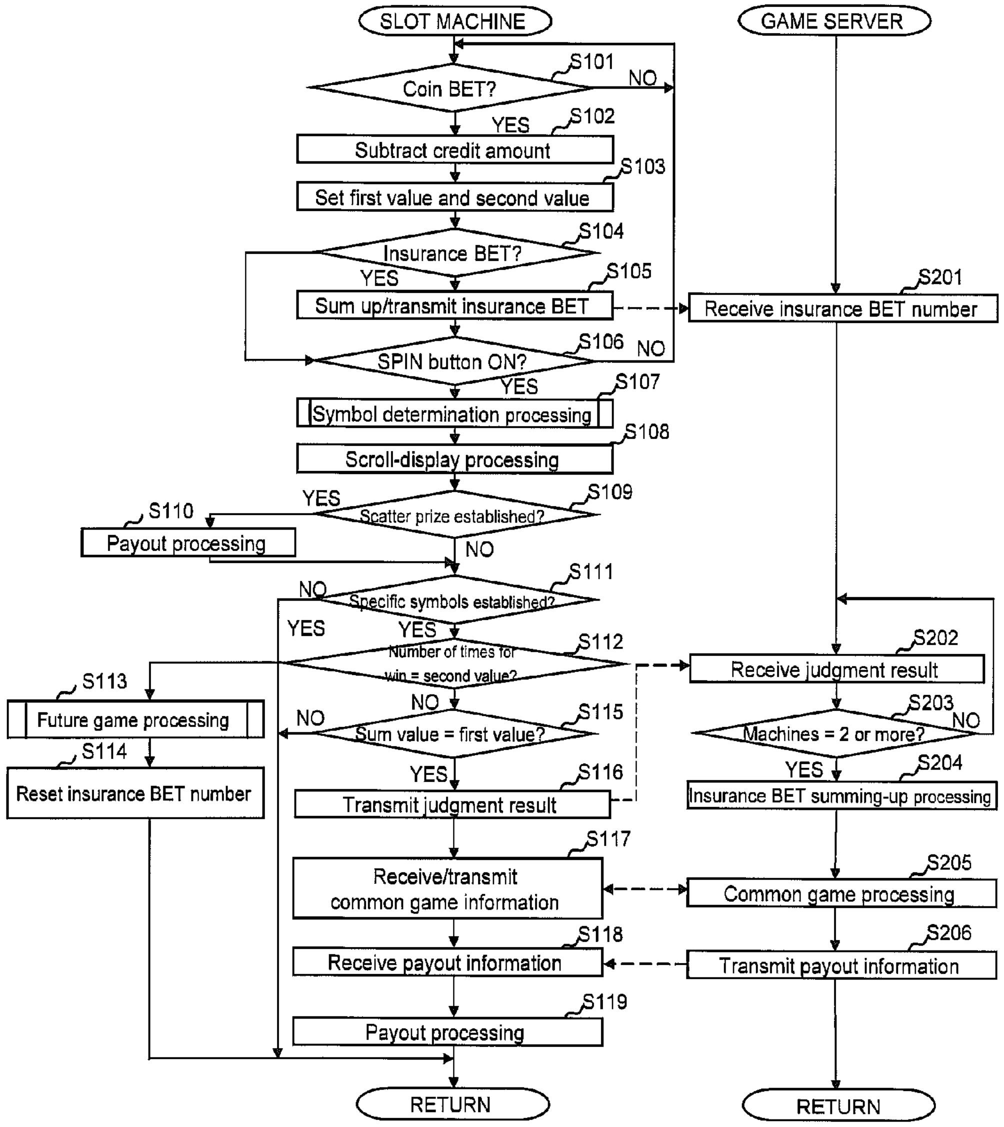
FIG. 10 is similar to FIG. 1 and is a flowchart showing a subroutine of the Link game processing.
Figure 11A:
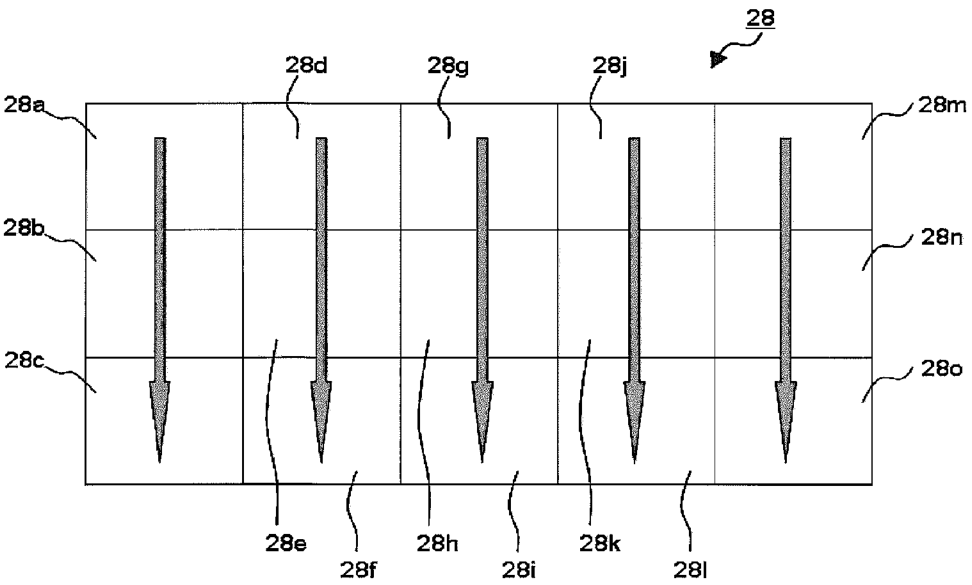
FIG. 11A is a view showing an exemplary display on a display.
Figure 11B:
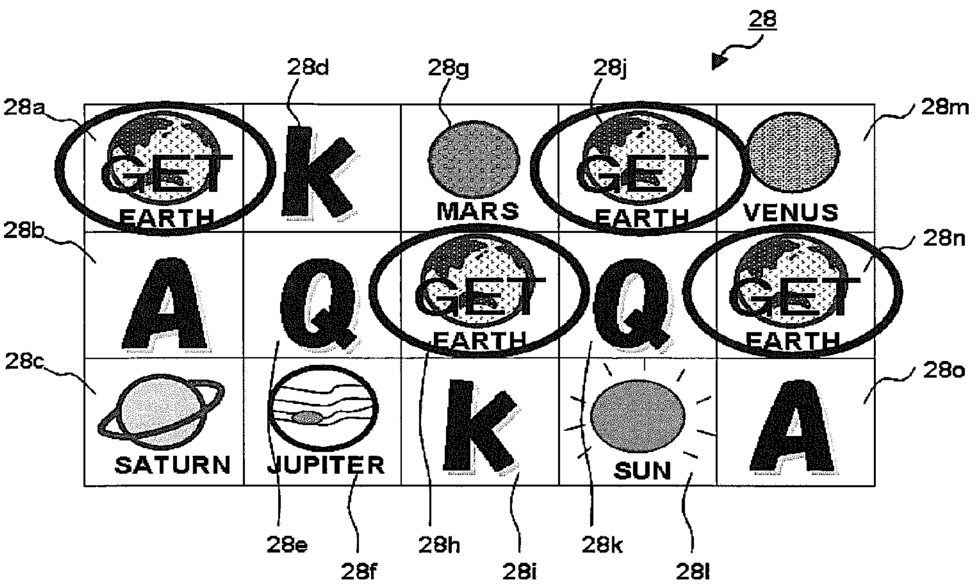
FIG. 11B is a view showing an exemplary display on the display.

Next, the Link game processing will be described. FIG. 10 is the same as FIG. 1, and is a flowchart showing the subroutine for the Link game processing. FIG. 11A and FIG. 11B are views showing an exemplary display on the display. The Link game processing to be described hereinafter is carried out through the cooperation of the main CPU 41 of the slot machines 10 and the CPU 201 of the game server 200.

The main CPU 41 of the slot machine 10 carries out the following processing at steps S101 through S118. First, at step S101, the main CPU 41 judges whether or not coins have been betted. In this processing operation, the main CPU 41 judges whether or not the input signal output from the 1-BET switch 26S has been received when the 1-BET button 26 has been operated; or, alternatively, whether or not the input signal output from the MAX-BET switch 27S has been received when the MAX BET button 27 has been operated. In a case where the main CPU 41 judges that no coins have been betted (S101: NO), the routine reverts to step S101. Alternatively, in a case where the main CPU 41 judges that coins have been betted (S101: YES), the routine proceeds to step S102.

Next, at step S102, in a case where it is judged that coins have been betted at step S101, the main CPU 41 of the slot machines 10 performs processing of subtracting the credit amount stored in the RAM43 in accordance with the number of betted coins. The main CPU 41 stores in the RAM 43 the credit amount after subtracted.

Next, at step S103, the main CPU 41 of the slot machine 10 sets the first value and the second value. The first value is the predetermined accumulated value (for instance, 500) of the insurance BET consumed on a game-by-game basis. The second value is a predetermined number of times for the BONUS win (for instance, 50 times). The main CPU 41 stores the first value (for instance, 500) and the second value (for instance, 50) in the RAM 43.

Next, at step S104, the main CPU 41 of the slot machine 10 judges whether or not the insurance BET has been placed. More specifically, the main CPU 41 judges whether or not the input signal output from the INSURANCE BET switch 90S has been received when the INSURANCE BET button 90 has been operated. In a case where the main CPU 41 judges that the insurance BET has been placed (S104: YES), the routine proceeds to step S105. Alternatively, in a case where the main CPU 41 judges that no insurance BET has been placed (S104: NO), the routine proceeds to step S106.

Next, at step S105, the main CPU 41 of the slot machine 10 counts the insurance BET accepted at step S104 in an accumulative manner and at the same time, stores the counted insurance BET number in the RAM 43. Then, the main CPU 41 transmits the insurance BET information stored in the RAM 43 to the game server 200.

Next, at step S106, the main CPU 41 of the slot machine 10 judges whether or not the SPIN button 23 has been turned ON. Specifically, the main CPU 41 judges whether or not the input signal output from the SPIN switch 23S has been received when the SPIN button 23 has been depressed. In a case where the main CPU 41 judges that the SPIN button 23 has not been turned ON (S106: NO), the routine reverts to step S101, and in a case where the CPU judges that the SPIN button 23 has been turned ON (S106: YES), the routine proceeds to step S107. In a case where it is judged that the SPIN button 23 has not been turned ON (for example, in a case where an instruction has been input to terminate a game without turning ON the SPIN button 23), the main CPU 41 cancels acceptance of a credit amount subtraction result of step S102.

Next, at step S107, the main CPU 41 of the slot machine 10 performs symbol determination processing. Specifically, in a case where the main CPU 41 judges that the SPIN button 23 has been turned ON at step S106, it determines a code No. at the time of stopping the symbols by executing the symbol determination programs stored in the RAM43. This processing operation will be described later in detail with referring to FIG. 12. The present embodiment describes a case of determining one or plural prizes from among plural types of prizes by determining symbols displayed in a stopped state. However, the present invention is not limitative thereto, and, for example, is applicable to a case in which one or a plurality of prizes selected from among the plural types of prizes are determined, and then, the combinations of symbols displayed in a stopped state are determined based upon the above-mentioned prizes.

Next, at step S108, the main CPU 41 of the slot machine 10 performs scroll-display processing. Specifically, the main CPU 41 starts display of plural types of symbols in a scrolled manner, and then, performs display control so that the symbols determined at step S107 are displayed in a stopped state in display blocks 28, concurrently when the display in a scrolled manner is stopped after the elapse of a predetermined time. In the present embodiment, display of the plural types of symbols in a scrolled manner is started in the direction of the illustrated arrows, as shown in FIG. 11A.

Next, at step S109, the main CPU 41 of the slot machine 10 judges whether or not a scatter prize is established. Specifically, the main CPU 41 judges whether or not three or more trigger symbols for the scatter prize are displayed in a stopped state in any of display blocks 28, and the scatter prize is established. More specifically, this CPU judges whether or not three or more symbols of the same type, from among "JUPITER", "SATURN", "SUN", "VENUS", "MARS", "MERCURY", "K", "J", "Q", and "A", are displayed in a stopped state in any of the display blocks 28, based on FIG. 5. In a case where the main CPU 41 judges that the scatter prize is established, based upon FIG. 5 (S109: YES), the routine proceeds to step S110 at which coin payout processing is performed. In a case where this CPU 41 judges that the scatter prize is not established (S109: NO), the routine proceeds to step S111 without performing coin payout.

Next, at step S110, the main CPU 41 of the slot machine 10 executes payout processing. Specifically, in a case where the main CPU 41 judges that three or more trigger symbols for the scatter prize of the same type, have been displayed in a stopped state at step S109, this CPU executes payout of a predetermined number of coins, which corresponds to the types and number of symbols displayed in a stopped state and the BET number, based upon FIG. 5. In the present embodiment, as shown in FIG. 11B, three or more trigger symbols for the scatter prize are not rearranged in display blocks 28. Thus, the payout of coins as the scatter prize is not performed.

Next, at step S111, the main CPU 41 of the slot machine 10 displays a predetermined number of trigger symbols for the BONUS in a stopped state, and judges whether or not a BONUS win is established. The process at step S111 is carried out in the case that it is judged that a scatter prize is not established (S109: NO) at step S109; or alternatively, this process is carried out in the case that the coin payout processing after the scatter prize has been established at step S110 is terminated. Hereinafter, the main CPU 41 judges whether three or more "EARTH" symbols which are the trigger for BONUS have been displayed in a stopped state on any of the display blocks 28. In a case where the main CPU 41 judges that the BONUS win is established (S111: YES), the main CPU 41 adds one count to the number of times for the BONUS win stored in the RAM 43 and stores again the number of times for the BONUS in the RAM 43, after which the routine proceeds to step S112. Alternatively, in a case where the main CPU 41 judges that the BONUS win is not established (S111: NO), the main CPU 41 terminates this sub-routine. In the present embodiment, it is judged that the BONUS win is established, as four "EARTH" symbols which are the trigger for the BONUS are displayed in a stopped state on the display blocks 28, as shown in FIG. 11B.

In a case that the main CPU 41 judges that the scatter prize is not established in the slot machine 10 at step S109 (S109: NO) and in a case where this CPU judges that the BONUS prize is not established at step S11 (S111: NO), it is determined to be "losing", that does not come under any of the prizes. The above-mentioned "losing" denotes a case in which no coin payout is performed.

Next, at step S112, the main CPU 41 of the slot machine 10 judges whether or not the number of times for the BONUS win which is stored in the RAM 43 at step S111 has reached the second value (for instance, 50 times) stored in the RAM 43 at step S103. In a case where the number of times for the BONUS win judged at present has reached the second value (for instance, 50 times) set in advance, a "BONUS IN" is set.

Next, at step S113, the main CPU 41 of the slot machine 10 executes future game processing. Specifically, the main CPU 41 reads, from the RAM 43, a program for performing a future game at the time of executing future game processing. Then, at the time of starting the future game, the main CPU 41 executes the random number generation program included in the symbol determination programs to select a random number value. After that, this CPU 41 executes a free game by a predetermined number of times, based upon the selected random number value. After the future game processing has been executed, the main CPU 41 executes coin payout, based upon the payout number of coins acquired in the future game processing. The future game processing will be described later in detail with referring to FIG. 13.

Next, at step S114, the main CPU 41 of the slot machine 10 resets the value of the insurance BET number stored in the RAM 43 at step S105 to "0". The main CPU 41 then terminates this subroutine.

Next, at step S115, the main CPU 41 of the slot machine 10 judges whether or not the insurance BET number stored accumulatively in the RAM 43 at step S105 reaches the first value (for instance, 500) stored in the RAM 43 at step S103. As a result of the judgment, in a case where the main CPU 41 judges that the insurance BET number accumulatively added reaches the first value (for instance, 500) set in advance (S115: YES), the routine proceeds to step S116, at which information concerning this judgment result is transmitted to the game server 200. In a case where the main CPU 41 judges that the insurance BET number added accumulatively fails to reach the first value set in advance (for instance, 500) (S115: NO), the main CPU 41 terminates this sub-routine.

At step S117, the main CPU 41 of the slot machine 10 carries out transmission and reception of information concerning the common game executed on the common display 300 at step S205 to be described later, with the game server 200.

Next, at step S118, the main CPU 41 of the slot machine 10 receives the payout information transmitted from the game server 200. Specifically, the payout information represents information for awarding a prize including a total insurance BET number of the summing-up result at step S204 to be described later, to a specified slot machine based on the outcomes of the common game executed in the common display 300.

Next, at step S119, the main CPU 41 of the slot machine 10 executes coin payout corresponding to the total insurance BET number of the summing up result at step S204, based on the payout information received at step S118.

The operation of the game server 200 will next be described. The CPU 201 of the game server 200 carries out the processing at the following steps S201 through S206. First, at step S201, the CPU 201 receives the insurance BET information transmitted from the slot machine 10 at the above-mentioned step S105. The CPU 201 stores the insurance BET number accepted at the slot machine 10 like with the slot machine side, in the RAM 203, based on the received insurance BET information. The RAM 203 stores the insurance BET number for each slot machine 10.

Next, at step S202, the CPU 201 of the game server 200 receives the judgment result information transmitted from the slot machine 10 at the above-mentioned step S116. The CPU 201 recognizes that the insurance BET number invested at the slot machine 10 on the estimation side has reached the first value (for instance, 500), based on the received judgment result information.

Next, at step S203, the CPU 201 of the game sever 200 judges whether or not reception of the judgment result information at the above-mentioned step S202 occurs from two or more slot machines 10. As a result of the judgment, in a case where the CPU 201 judges that reception of the judgment result information at step S202 occurs from two or more slot machines 10 (S203: YES), the routine proceeds to step S204. Alternatively, in a case where the CPU 201 judges that reception of judgment result information at S202 does not occur from two or more slot machines 10 (S203: NO), the routine reverts to step S202 and the processing is repeated.

Next, at step S204, the CPU 201 of the game server 200 carries out a summing-up processing of the insurance BET number. Specifically, the CPU 201 executes a processing of summing up the respective insurance BET numbers stored in the RAM 203 of two or more slot machines 10, at step S201, that received the judgment result information at step S203. At the same time, the CPU 201 stores the value of the summing-up result in the RAM 203. For instance, if two slot machines enter the Link game, and the insurance BET number invested in each of the two slot machines 10 exceeds the first value (for instance, 500), the insurance BET number invested in each of the two slot machines is summed up at the game server 200. At this time, if the insurance BET numbers invested in the two slot machines 10 are 500BET and 650BET, respectively, the game server 200 sums up these BET numbers and stores the result “1150” of the summing-up result in the RAM 203.

Next, at step S205, the CPU 201 of the game server 200 executes common game processing. Specifically, the CPU 201 reads the common game program from the ROM 202 and executes the common game based on the read common game program, and at the same time, displays the executed common game on the common display 300. The CPU 201 also transmits information concerning the common game executed on the common display 300 to the slot machine 10. In this common game, a free game is carried out in a predetermined number of times amongst the plurality of slot machines 10 and a prize is awarded to the slot machine 10 at which the number of times for the BONUS win first reaches the second value (for instance, 50 times) stored in the RAM 43 at step S103.

Next, at step S206, the CPU 201 of the game server 200 transmits the payout information based on the outcomes of the common game carried out at step S205, to the slot machine 10.

Figure 12:
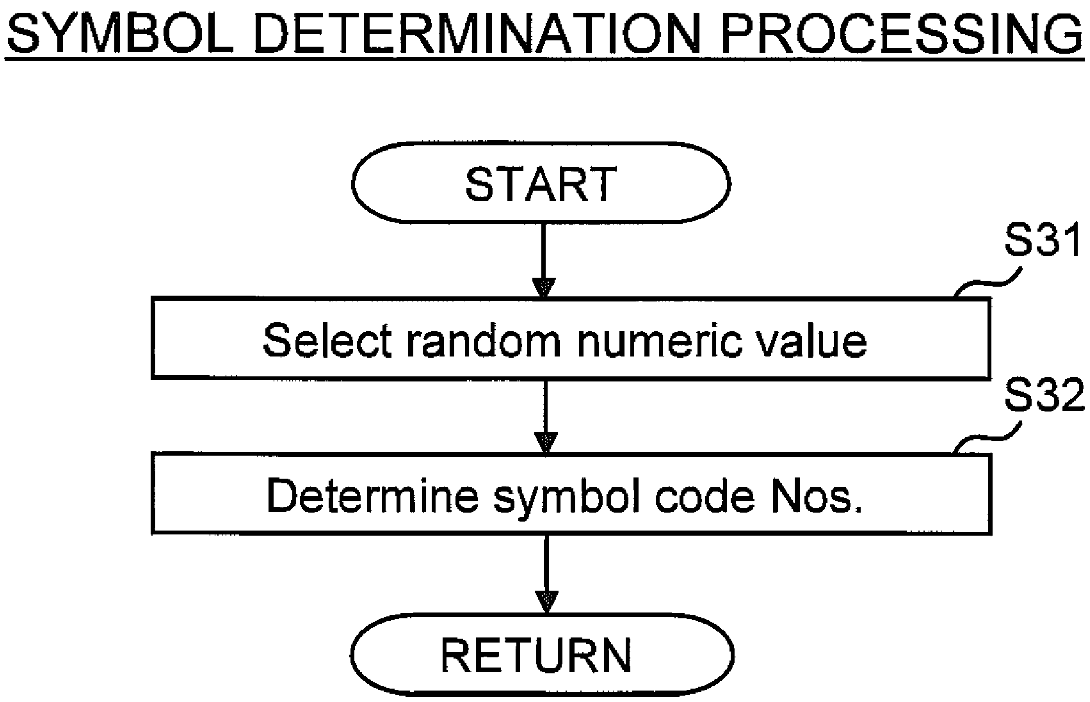
FIG. 12 is a flowchart showing a subroutine of symbol determination processing.

Next, symbol determination processing will be described. FIG. 12 is a flowchart showing a subroutine of symbol determination processing executed by the slot machine 10 at step S107 shown in FIG. 10. In this processing, the main CPU 41 of the slot machine 10 executes the symbol determination program stored in the RAM 43.

First, at step S31, the main CPU 41 of the slot machine 10 executes processing of selecting a predetermined random number value. Specifically, the main CPU 41 executes the random number generation program included in the symbol determination program, thereby selecting five random number values corresponding to each of the symbol columns (5 columns) from among the numeric values ranging from 0 to 255. The present embodiment describes a case in which random numbers are generated on a program (a case in which so-called software random numbers are employed). In the present invention, however, a random number generator is provided whereby random numbers may be extracted from the random number generator (so-called hardware random numbers may be employed).

Next, at step S32, the main CPU 41 of the slot machine 10 determines code Nos. of symbol columns (refer to FIG. 4), based upon the five random number values selected at step S31. Code Nos. of the symbol columns correspond to those of symbols displayed in a stopped state on the display blocks 28. The main CPU 41 determines prizes by determining code Nos. of symbol columns. As shown in FIG. 4, for example, in a case where the main CPU 41 determines that code Nos. of symbols are “00”, “01”, “02”, “03”, and “04”, the prize is determined to be “EARTH”.

Figure 13:
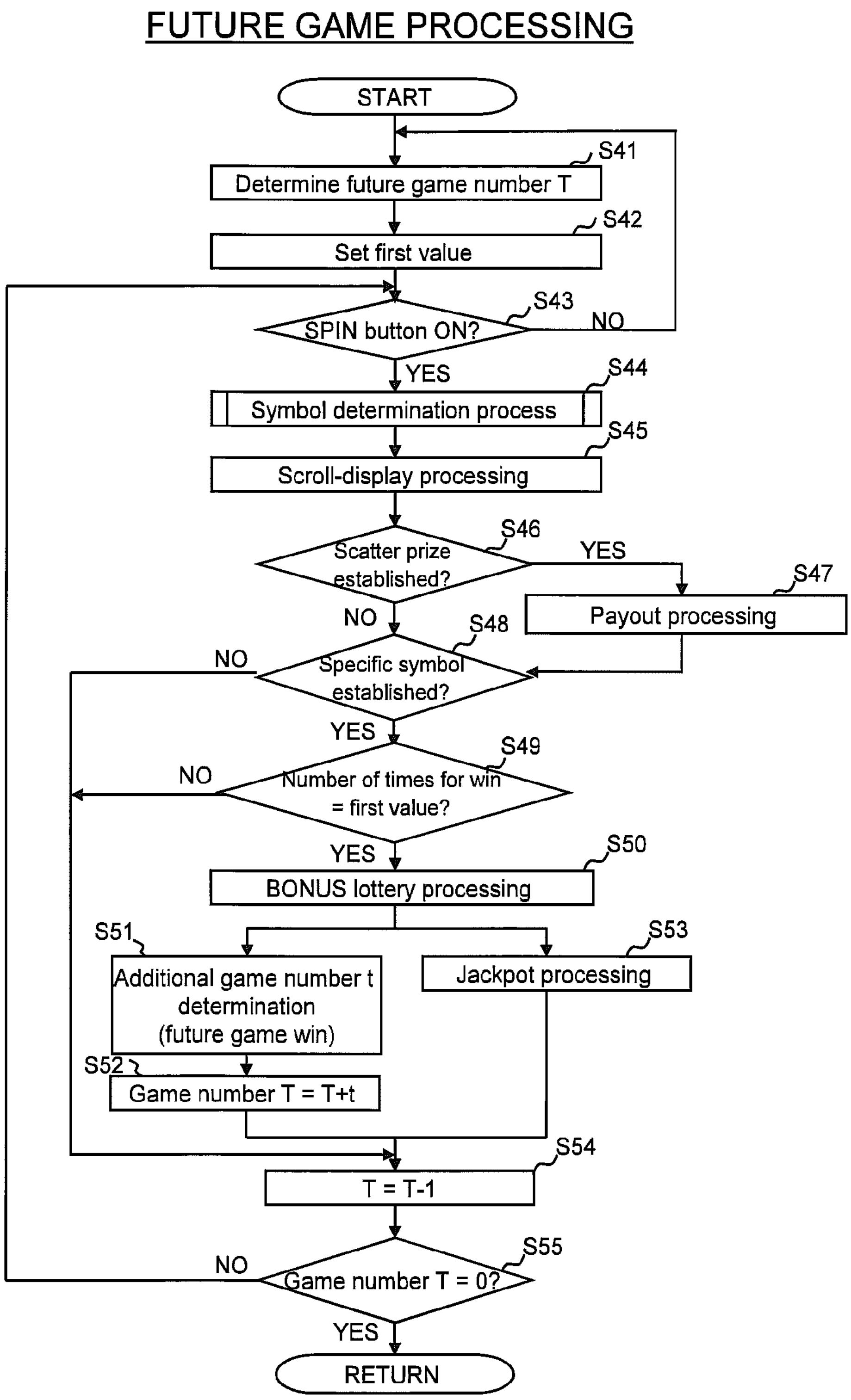
FIG. 13 is a flowchart showing a subroutine of future game processing.

Next, future game processing will be described. FIG. 13 is a flowchart showing a subroutine of the future game processing executed by the slot machine 10 at step S113 shown in FIG. 10. In the future game processing, a free game is executed by a predetermined number of times, without inputting a BET number by use of the BET buttons 26 and 27.

First, at step S41, the main CPU 41 of the slot machine 10 selects future game (free game) number T executed in the future game. Specifically, the main CPU 41 determines game number T from among any of 10 to 25 games, based upon the random number values obtained by executing the random number generation programs stored in the RAM 43. The main CPU 41 stores, as data in the RAM 43, the game number T executed in the thus determined future game.

Next, at step S42, the main CPU 41 of the slot machine 10 sets (stores) the first value (for instance, 50) in the RAM 43.

Next, at steps S43 through S48, the main CPU 41 executes SPIN button input judgment processing, symbol determination processing, scroll display processing, scatter prize judgment processing, payout processing and a BONUS win judgment processing. Processing carried out at each of steps S43 through S48 is substantially the same as that at each of the steps S106 through S111 shown in FIG. 10, and therefore, further description thereof is hereby omitted.

Next, at step S49, the main CPU 41 judges whether or not the number of times the BONUS win is established, which has been counted at step S48, reaches the first value (for instance, 50) set at step S42. As a result of the judgment, if the main CPU 41 judges that this number of times reaches the first value (S49: YES), the “BONUS IN” is set and the routine proceeds to step S50. Alternatively, if the CPU 41 judges that this number fails to reach the first value (S49: NO), the routine proceeds to step S54.

Next, at step S50, the main CPU 41 of the slot machine 10 executes BONUS lottery processing. More specifically, if “BONUS IN” is set at step S49, the main CPU 41 refers to the BONUS lottery table stored in ROM 42 and randomly selects whether to shift to the future game or payout a progressive jackpot. Hereinafter, the main CPU 41 selects a predetermined random numeric value from a plurality of random numeric values shown in the BONUS lottery table to select either of the above-mentioned future game and the progressive jackpot.

Next, at step S51, if a future game is selected by carrying out the BONUS lottery at step S50, during the future game, the main CPU 41 of the slot machine 10 newly selects a number of times t in repeating the future game (free game). At step S52, the main CPU 41 adds the number of times t selected at step S51 to the game number T for the present bonus game. Then, the main CPU 41 stores the number of times for the game T=(T+t) obtained through the addition at step S51, in the RAM 43. Thus, if a future game is won during the future game, the remaining number of future games increases. Specifically, if the player shifted to a total of 20 future games at first, when the player wins a number of 17 future games in the $12^{th}$ future game, a future game will be carried out thereafter by 25 (20−12+17) times.

Next, at step S53, if the main CPU 41 of the slot machine 10 selects a progressive jackpot during the future game, by BONUS lottery at step S50, the main CPU 41 executes jackpot processing during the future game. Specifically, the main CPU 41 executes payout of a large amount of coins based on the progressive value stored in RAM 43.

Next, at step S54, the main CPU 41 of the slot machine 10 reads game number T of the future games stored in the RAM 43, and then, subtracts the value of the read game number T by 1. Then, the main CPU 41 stores the game number T after subtraction again in the RAM43.

Next, at step S55, the main CPU 41 of the slot machine 10 judges whether or not the game number T of the future games has reached the number of times determined at step S41. Specifically, the main CPU 41 makes determination in accordance with whether or not the game number T stored in the RAM 43 is set to 0. Then, in a case where the game number T is not set to 0 (S55: NO), i.e., in a case where the number of times in executing the future game fails to reach the game number determined at step S41, the main CPU 41 reverts the routine to step S43, and then, repeats the processing at the steps S43 to S55 mentioned above. On the other hand, in a case where it is judged that the game number T of the future games is set to 0 (S55: YES), i.e., in a case where it is judged that the number of times determined at step S41 has been reached, the main CPU 41 terminates this subroutine.

Figure 14:
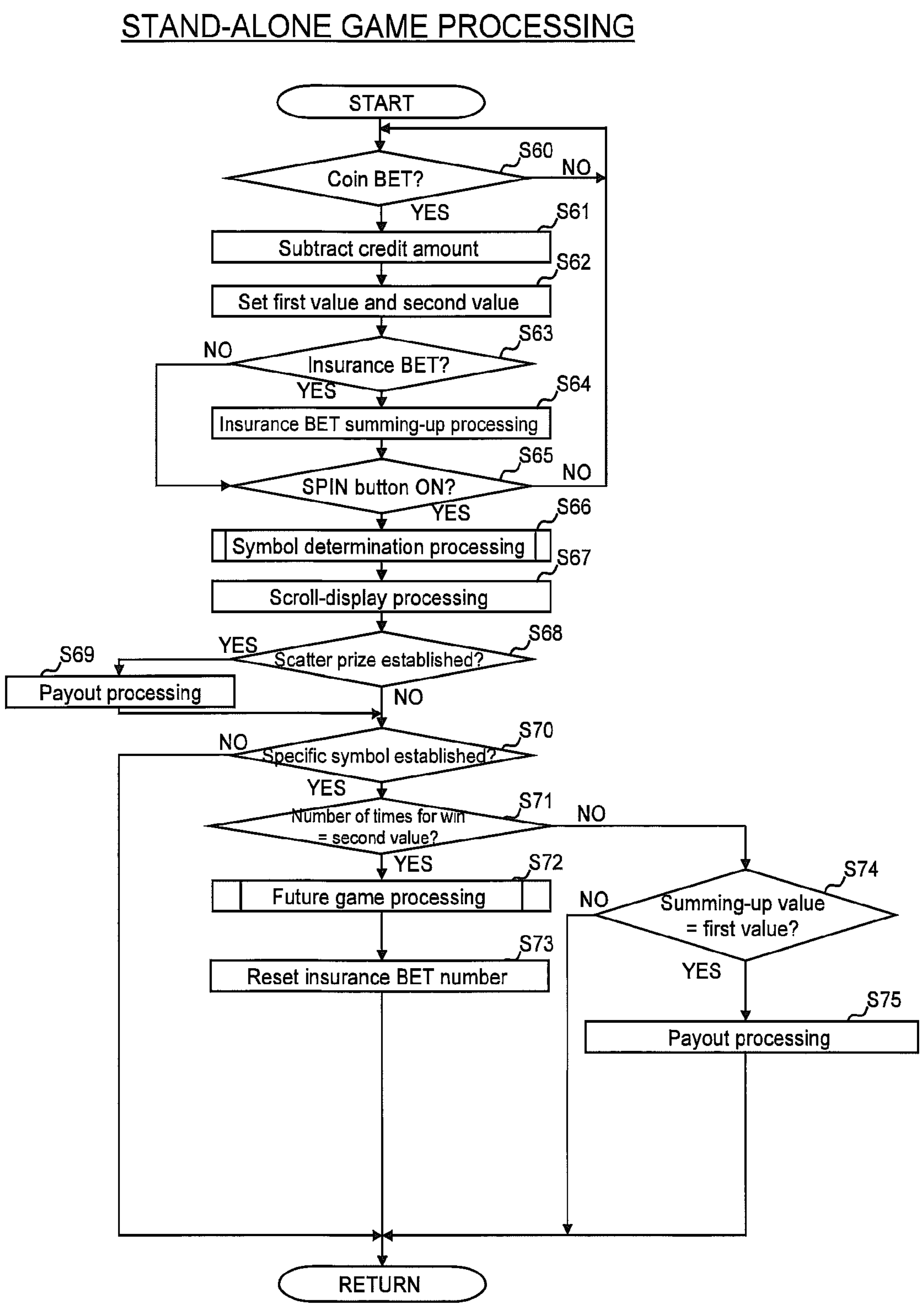
FIG. 14 is a flowchart showing a subroutine of Stand-Alone game processing.

FIG. 14 is a flowchart showing a subroutine of Stand-Alone game processing. The Stand-Alone game processing is carried out in a case where the main CPU 41 of the slot machine 10 judges, at step S11 shown in FIG. 8, that the player does not wish to enter the Link game.

The processing at each of steps S60 through S73 is substantially the same as the processing at each of steps S101 through S114 shown in FIG. 10 and therefore, description thereof is hereby omitted. Step S64 shown in FIG. 14 and step S105 shown in FIG. 10 differ from one another in that transmission and reception of data with the game server 200 does not occur.

In the Stand-Alone game, each slot machine 10 operates independently from the other slot machines 10, without the interposition of a communication line. At step S71, the main CPU 41 judges whether or not the number of times for the BONUS win reaches the second value set in advance (for instance, 50 times). If it is judged that this number of times fails to reach the second value, the main CPU 41 judges, at step S74 whether or not the insurance BET number invested on a game-by-game basis reaches the first value (for instance, 500 coins) set in advance. In the case that the insurance BET number reaches the first value, the main CPU 41 executes payout of a predetermined number of coins (for instance, 150 coins) as insurance.

If a player requests entry to the Link game in the game system 100 and controlling method thereof according to the present embodiment, the Link game is started between the plurality of slot machines 10 and the game server 200. The plurality of slot machines 10 execute the following processing. The slot machines store the first value (for instance, 500) and the second value (for instance, 50) in the RAM 43. Then, the slot machines accept the insurance BETs input from the INSURANCE BET button 90 and count the received insurance BETs in an accumulative manner, and at the same time, store the counted value in the RAM 43. The counted insurance BET information is transmitted to the game server 200. The game server 200 receives the insurance BET information from the slot machines 10.

Then, the plurality of slot machines 10 execute the following processing. A plurality of types of symbols arranged in display blocks 28 of the lower image display panel 16 are automatically rearranged. The slot machines judge whether or not three or more trigger symbols for the scatter prize are displayed in a stopped state on any of the display blocks 28 onto which the symbols have been rearranged and a scatter prize is established; or, alternatively, whether or not three or more trigger symbols for BONUS are displayed in a stopped state on any of the display blocks 28 and the BONUS win is established. As a result of the judgment, if it is judged that the scatter win is established, a predetermined number of coins are paid out in accordance with the number of displayed symbols. Also, as a result of the judgment, if it is judged that the BONUS win is established, the BONUS win is counted as one count and at the same time, the counted number of times is stored in the RAM 43. As a result of repeating the game, if the number of times for the BONUS win stored in the RAM 43 has reached the second value (for instance, 50 times) stored in advance in the RAM 43, the "BONUS IN" is set. In a case where the "BONUS IN" is set, a future game is awarded, as a prize, to the player, and at the same time, the insurance BET number stored in the RAM 43 is reset to "0".

The plurality of slot machines 10 also execute the following processing. As a result of repeating the above-mentioned game, the slot machines 10 judge whether or not the insurance BET number stored accumulatively reaches the first value (for instance, 500) stored in advance in the RAM 43. As a result of the judgment, if it is judged that the insurance BET number has reached the first value, the judgment result information is transmitted to the game server 200.

The game server 200 executes the following processing. The game server 200 receives the judgment result information transmitted from the slot machine 10. The game server 200 judges whether or not the judgment result information is received from at least two or more slot machines 10. If the result of the judgment is affirmative, the respective insurance BET numbers from the at least two or more slot machines 10 that received the judgment result information are summed up. The common game shared by two or more slot machines 10 is executed, for instance, on the common display 300. The information concerning the common game is then transmitted to each slot machine 10. Each slot machine 10 receives information concerning the common game.

The game server 200 transmits information concerning award of a prize including a total insurance BET number obtained in the summing-up operation in the previous processing to a specified slot machine 10 from the two or more slot machines 10, based on the outcomes of the common game. The slot machine 10 that received this information executes payout of a predetermined number of coins corresponding to the total insurance BET number of the summing-up result based on this information.

Figure 15:
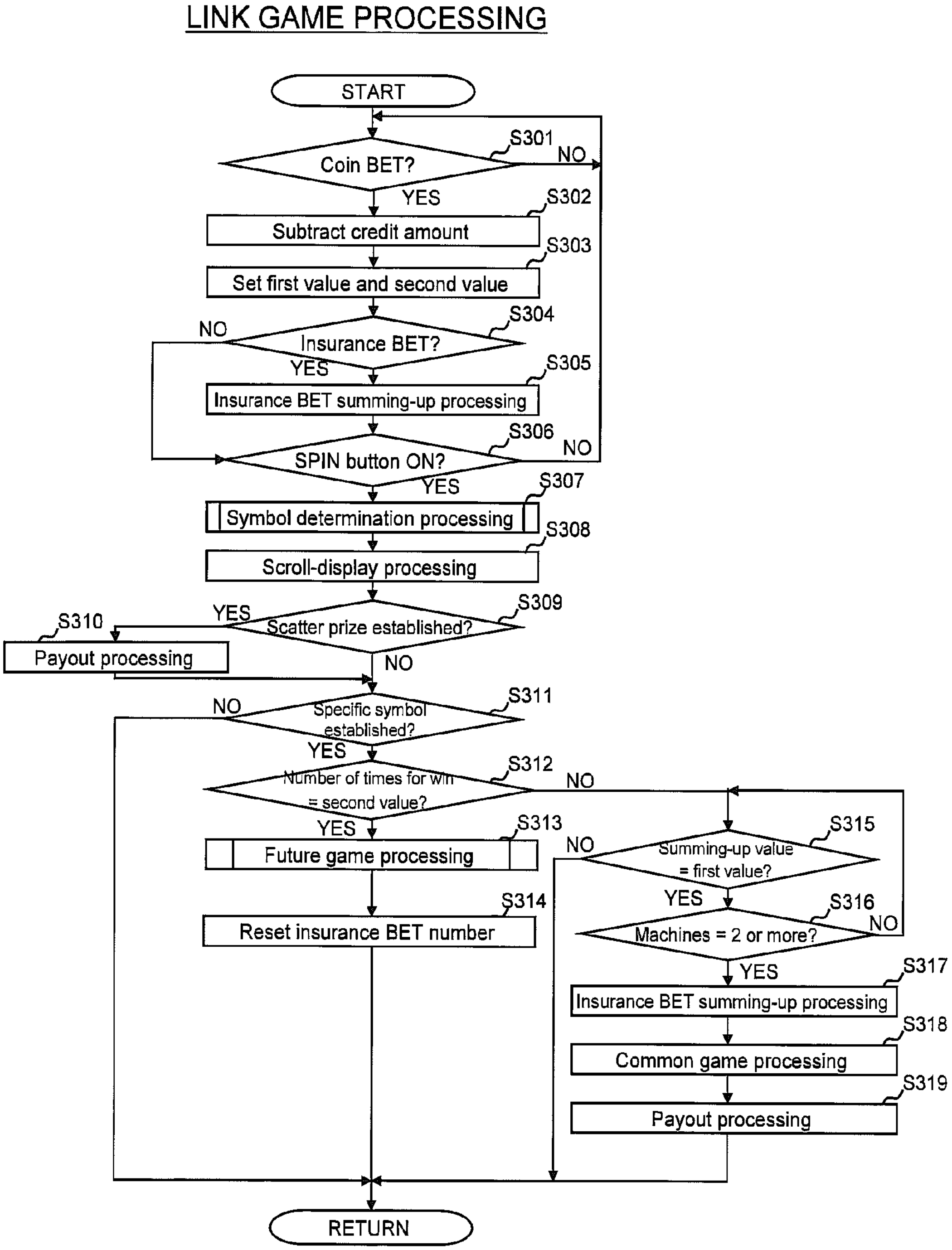
FIG. 15 is a flowchart showing a subroutine of Link game processing according to another embodiment.

FIG. 15 is a flowchart showing the subroutine of the Link game processing according to another embodiment. The Link game processing shown in FIG. 15 differs from the above-mentioned Link game processing shown in FIG. 10 in that the game is carried out between the respective slot machines 10 without the interposition of the game server. The Link game processing will hereinafter be schematically described based on FIG. 15.

Hereinafter, the main processing of the main CPU 41 in each slot machine 10 that received the entry request to the Link game will be schematically described. First, in a case where the player makes a request to enter the Link game, the main CPU 41 establishes a communication connection between the plurality of slot machines 10 and then starts Link game processing. At step S301, the first value, as a predetermined accumulated value of the insurance BET (for instance, 500 coins) and a second value, as predetermined accumulated number of times for the BONUS win (for instance, 50 times) are stored in the RAM 43. Aside from accepting the BET for the game start at step S301, the main CPU 41 accepts, at step S304 the insurance BET, as insurance, which is input from the INSURANCE BET button 90. At step S305, the main CPU 41 counts the received insurance BETs in an accumulative manner and then stores the counted value in the RAM 43. The counted insurance BET information is transmitted to each slot machine 10.

Then, the main CPU 41 in each slot machine 10 executes the following processing. At step S308, a plurality of types of symbols arranged in display blocks 28 of the lower image display panel 16 are automatically rearranged. At steps S309 and S311, the main CPU 41 judges whether or not three or more trigger symbols for the scatter prize are displayed in a stopped state on any of the display blocks 28 onto which the symbols have been rearranged and a scatter prize is established; or, alternatively, whether or not three or more trigger symbols for BONUS are displayed in a stopped state on any of the display blocks 28 and the BONUS win is established.

As a result of the judgment, if it is judged that the scatter win is established, a predetermined number of coins are paid out in accordance with the number of displayed symbols, at step S310. Also, as a result of the judgment, if it is judged that the BONUS win is established, the BONUS win is counted as one count and at the same time, the counted number of times thereof is stored in the RAM 43. As a result of repeating the game, if the number of times for the BONUS win stored in the RAM 43 has reached the second value (for instance, 50 times) stored in advance in the RAM 43 at step S303, the "BONUS IN" is set. In a case where the "BONUS IN" is set, a future game is awarded, as a prize, to the player, and at the same time, the insurance BET number stored in the RAM 43 is reset to "0", at step S313 and S314, respectively.

The main CPU 41 in each of the plurality of slot machines 10 carries out the following processing. At step S315, as an outcome of repeating the above-mentioned game, in a case where a BONUS win fails to be established and a future game is not won, the CPU 41 judges whether or not the insurance BET number stored accumulatively reaches the first value (for instance 500 coins) stored in advance in the RAM 43 at step S303. At step S316, if it is judged, as result of the judgment, that the insurance BET number reaches the first value, the judgment result information is transmitted to each slot machine 10.

The main CPU 41 in each slot machine 10 executes the following processing. At step S316, the main CPU 41 receives the judgment result information transmitted from the slot machine 10. At step S316, if the CPU 41 judges that the insurance BET number stored accumulatively in at least two or more slot machines 10 reaches the first value (for instance, 500 coins), the respective insurance BET numbers accumulated in each slot machine 10 are summed up and the resulting value is stored in the RAM 43 (step S317). At step S318, the main CPU 41 executes the common game shared by the slot machines 10 on the common display 300, for instance. The main CPU 41 carries out transmission and reception of information concerning the common game among the slot machines 10. In the common game, a free game is executed by a predetermined number of times among the plurality of slot machines 10, and a prize is awarded to the slot machine 10 at which the number of times for the BONUS win has first reached the second value (for instance, 50 wins) stored in the RAM 43. At step S319, the main CPU 41 of the slot machine 10 executes payout of a predetermined number of coins corresponding to a total insurance BET number of the summing-up result in the previous processing, based on the outcome of the common game.

In the above-mentioned example, it was described that the slot machines execute two types of games, inclusive of the Stand-Alone game and the Link game. However, the present invention is not limitative thereto and slot machines which execute only the Link game may be employed.

While it was described in the above example that the prize depending upon the outcome of the common game is represented by coin payout corresponding to a sum value of the insurance BET number accumulated in each slot machine, the present invention is not limitative thereto. Thus, since the trigger for the common game outcome is a process similar to the trigger for the future game processing (number of times for BONUS win=second value (for instance, 50 wins)), a future game may be awarded, as prize, to a specific player, in addition to the above-mentioned coin payout.

In the above-mentioned example, it was described that the first value and the second value are fixed values. However, either of the first and the second values may be a variable value which is randomly determined on a game-by-game basis by selecting a predetermined random numeric value.

While it was described in the above-mentioned example that placing the insurance BET by operating the INSURANCE BET button 90 is a voluntary act carried out by the player, the present invention is not limitative thereto. For example, as is the case with the BET for the game start, the insurance BET may be a required act for executing the game.

While it was described in the above-mentioned example that the future game is executed in the case where the second value is set and the number of times for the BONUS win has reached the second value, the present invention is not limitative thereto. The trigger for the future game may be established in accordance with the number of the predetermined symbols, or alternatively, may be established by a combination of predetermined symbols.

In the above-mentioned example, it was described that the counting condition for the number of times for the BONUS win is the case that a predetermined number of predetermined symbols are arranged. However, the present invention is not limitative thereto and the counting condition may also be a predetermined symbol combination.

While in the above-mentioned example it was described that merely the number of times for the BONUS win is counted, the invention is not limitative thereto. Thus, the number of times for the BONUS win may be counted with each BONUS win and at the same time, a predetermined payout in accordance with the BONUS win may be awarded.

While in the above-mentioned example it was described that the count condition for the number of times for the BONUS win is the case that three or more specified symbols (3, 4, 5) are displayed in a stopped state, the present invention is not limitative thereto. For instance, in case of three specified symbols, the count of the number of times for the BONUS win may be one count, in case of four specified symbols, the count of the number of times may be 2 counts, and in case of five specified symbols, the count of the number of times may be 3 counts.

While the above-mentioned example described a case of displaying a total of 15 symbols made up of 5 columns and 3 rows, a display mode of symbols in the present invention is not limitative to 5 columns and 3 rows. This display mode is applicable to various combinations such as a combination of symbols made up of 3 columns and 3 rows. In addition, while the above-mentioned example described a case in which symbols are displayed in a scrolled manner by display blocks, these symbols may be individually displayed in a scrolled manner.

While the above-mentioned example described that symbols are displayed in a scrolled manner using a liquid crystal display device or the like, the present invention is not limitative thereto. In a case where mechanical reels are employed, the symbols may be graphically displayed on the surface of the mechanical reels.

While the embodiment according to the present invention has been described, the description presents only some of the specific examples and is not intended to limit the present invention in any way and specific constructions of each means and the like can be properly changed in terms of design. Besides, the effects described in the embodiment of the present invention are only the most preferable effects generated from the present invention and the effects to be derived from the present invention are not limitative thereto.

The more important features of the invention have thus been outlined, rather broadly, in order that the aforementioned detailed description thereof may be better understood, and in order that the present contribution to the art may be better appreciated. There are, of course, additional features of the invention that were described above and which formed the subject matter of the claims appended hereto. In this respect, upon explaining at least one embodiment of the invention in detail, it is to be understood that the invention is not limitative in its application to the details of construction and to the arrangements of the components set forth in the aforementioned description or illustrated in the drawings. According to the invention, other embodiments can be variously practiced and carried out as well. Also, it is to be understood that the phraseology and terminology employed herein are merely intended for the descriptive purpose and should not be regarded as limiting. As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These matters together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matters in which there are illustrated preferred embodiments of the invention.

The detailed descriptions aforementioned may be presented in terms of program procedures executed on a computer or network of computers. These procedural descriptions and representations are the means used by those skilled in the art to most effectively convey the substance of their work to others skilled in the art. A procedure is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities. Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices. The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required method steps. The required structure for a variety of these machines will appear from the description given.

What is claimed is:

1. A game system, comprising:

a plurality of gaming machines capable of communicating with each other via a communication line, the plurality of gaming machines each having:

(i) a display device onto which a plurality of types of symbols are arranged;

(ii) an input device operable to input an insurance BET;

(iii) at least one memory; and (iv) a controller;

the controller being configured to:

(a) store a first predetermined value and a second predetermined value in the memory;

(b) accept an insurance BET input from the input device;

(c) count the insurance BET thus accepted in an accumulative manner, and store the insurance BET number thus counted in the memory;

(d) automatically re-arrange the plurality of types of symbols arranged on the display device;

(d-1) judge whether a predetermined state of arrangement of symbols is established on the display device on which the symbols are rearranged at the itemized (d);

(d-2) count said predetermined symbol arrangement state as one count, and store the counted value in the memory in a case where it is judged, as a result of the judgment at the itemized (d-1), that said predetermined symbol arrangement state is established;

(d-3) judge whether the counted value of arrangement state of the predetermined symbols stored at the itemized (d-2) reaches the second predetermined value stored at the itemized (a), as a result of repeating processing from the itemized (b) to (d-2);

(d-4) award a prize of a predetermined value, and reset the insurance BET number stored at the itemized (c) to a default value in a case where it is judged, as a result of said judgment at the itemized (d-3), that said count value reaches the second predetermined value;

(e) judge whether the insurance BET number stored accumulatively at the itemized (c) reaches the first predetermined value stored at the itemized (a) as a result of repeating processing from the itemized (b) to (d);

(f) judge whether a same result as said a result of said judgment at the itemized (e) is obtained by at least two or more gaming machines from among the plurality of gaming machines in a case where it is judged, as a result of said judgment at the itemized (e), that the insurance BET number stored accumulatively at the itemized (c) reaches the first predetermined value stored at the itemized (a);

(g) sum up the accumulated insurance BET number of said at least two or more gaming machines of the plurality gaming machines stored accumulatively at the itemized (c), and store a total insurance BET number summed up in the memory, in a case where it is judged, as a result of said judgment at the itemized (f), that the insurance BET number of said at least two or more gaming machines of the plurality of gaming machines stored accumulatively reaches the first predetermined value;

(h) execute a common game shared among said at least two or more gaming machines of the plurality of gaming machines; and (i) award a prize to a specific gaming machine from said at least two or more gaming machines from among the plurality of gaming machines, the prize including said total insurance BET number stored at the itemized (g), based on an outcome of the common game thus executed.

2. The game system according to claim 1, further comprising a central display device capable of communication with the plurality of gaming machines, wherein the controller displays and executes, on the central display device, at the itemized (h), a common game which is shared among said at least two or more gaming machines of the plurality of gaming machines.

3. A game system, comprising:

(a) a plurality of gaming machines capable of communicating with each other via a communication line, the plurality of gaming machines each having:

a display device onto which a plurality of types of symbols are arranged;

an input device operable to input an insurance BET; and at least one memory; and (b) a central controller capable of communicating with the plurality of gaming machines, the plurality of gaming machines being configured to processing (a-1) to (a-11), and the central controller being configured to processing (b-1) to (b-6) as follows:

(a-1) the plurality of gaming machines store a first predetermined value and a second predetermined value in the memory;

(a-2) the plurality of gaming machines accept an insurance BET input from the input device;

(a-3) the plurality of gaming machines count the insurance BET thus accepted in an accumulative manner, and store the insurance BET number thus counted in the memory;

(a-4) the plurality of gaming machines transmit the insurance BET stored at the itemized (a-3) to the central controller;

(b-1) the central controller receives the insurance BET transmitted from the plurality of gaming machines at the itemized (a-4);

(a-5) the plurality of gaming machines automatically re-arrange the plurality of types of symbols arranged on the display device;

(a-6) the plurality of gaming machines judge whether a predetermined symbol arrangement state is established on the display device onto which the symbols are re-arranged at the itemized (a-5);

(a-7) in a case where it is judged, as a result of said judgment at the itemized (a-6), that said predetermined symbol arrangement state is established, the plurality of gaming machines count said predetermined symbol arrangement state as one count, and store the counted value in the memory;

(a-8) as a result of repeating processing from the itemized (a-2) to (a-7), the plurality of gaming machines judge whether the counted value obtained by counting said predetermined symbol arrangement state and stored at the itemized (a-7) reaches the second predetermined value stored at the itemized (a-1);

(a-9) in a case where it is judged, as a result of said judgment at the itemized (a-8) that the counted value reaches the second predetermined value, the plurality of gaming machines award a prize of a predetermined value, and reset the insurance BET number stored at the itemized (a-3) to a default value;

(a-10) as a result of repeating processing from the itemized (a-2) to (a-9), the plurality of gaming machines judge whether the insurance BET number stored accumulatively at the itemized (a-3) reaches the first predetermined value stored at the itemized (a-1);

(a-11) in a case where it is judged, as a result of said judgment at the itemized (a-10), that the insurance BET number reaches the first predetermined value, at least one or more gaming machines of the plurality of gaming machines transmit said result of said judgment to the central controller;

(b-2) the central controller receives said result of said judgment at the itemized (a-11) from said at least one or more gaming machines;

(b-3) the central controller judges whether said result of said judgment at the itemized (b-2) is received from said at least two or more gaming machines;

(b-4) if it is judged, as a result of said judgment at the itemized (b-3) that said result of said judgment is received, the central controller sums up respective insurance BET numbers received at the itemized (b-1) from said at least two or more gaming machines, which have received said result of said judgment;

(b-5) the central controller transmits information concerning a common game shared among said at least two or more gaming machines to said at least two or more gaming machines;

(a-11) said at least two or more gaming machines receives said information concerning the common game from the central controller;

(b-6) the central controller transmits information for awarding a prize to a specific gaming machine from said at least two or more gaming machines, based on said outcome of the common game, the prize including a total insurance BET number of said summing-up result at the itemized (b-4).

4. The game system according to claim 3, further comprising a central display device connected so as to allow communication with the central controller, and operable to display a predetermined picture, wherein the central controller transmits, at the itemized (b-5), information concerning the common game to said at least two or more gaming machines, and displays and executes the common game on the central display device.

5. A controlling method of a game system having a plurality of gaming machines capable of communicating with each other via a communication line, the plurality of gaming machines each having a display device onto which a plurality of types of symbols are arranged, an input device operable to input an insurance BET, at least one memory, and a controller; and the controlling method comprising the steps of:

(a) the controller storing at least one predetermined value in the memory;

(b) the controller accepting the insurance BET input from the input device;

(c) the controller counting the insurance BET thus accepted in an accumulative manner and storing the counted insurance BET number in the memory;

(d) the controller automatically re-arranging the plurality of types of symbols arranged on the display device;

(e) as a result of repeating the steps at the itemized (b) to (d), the controller judging whether the insurance BET number stored accumulatively at the itemized (c) reaches the predetermined value stored at the itemized (a);

(f) if it is judged, as a result of said judgment at the itemized (e), that the insurance BET number stored accumulatively at the itemized (c) reaches the predetermined value stored at the itemized (a), the controller judging whether a same result as said judgment result is obtained by at least two or more gaming machines from among the plurality of gaming machines;

(g) if it is judged, as a result of said judgment at the itemized (f), that the insurance BET number of said at least two or more gaming machines from among the plurality of gaming machines stored accumulatively reaches the predetermined value, the controller summing up the insurance BET number of said at least two or more gaming machines from among the plurality of gaming machines stored at the itemized (c), and storing a total insurance BET number of said summing-up result, in the memory;

(h) the controller executing a common game shared among said at least two or more gaming machines from among the plurality of gaming machines; and (i) the controller awarding a prize to a specific gaming machine from said at least two or more gaming machines from among the plurality of gaming machines, based on an outcome of the executed common game, the prize including said total insurance BET number stored at the itemized (g).

6. The controlling method of a game system according to claim 5, wherein:

the controller, at the itemized (a), sets said predetermined value to a first predetermined value, and further stores a second predetermined value in the memory, the second predetermined value being different from the first predetermined value; and the itemized (d) further includes the steps of:

(d-1) the controller automatically re-arranging said plurality of types of symbols which have been arranged on the display device;

(d-2) the controller judging whether a predetermined symbol arrangement state is established on the display device onto which the symbols are re-arranged;

(d-3) if it is judged, as a result of said judgment, that said predetermined symbol arrangement state has been established, the controller counting said predetermined symbol arrangement state as one count, and storing the counted value;

(d-4) as a result of repeating steps at the itemized (b) to (d-3), the controller judging whether the counted value obtained by counting said predetermined symbol arrangement state stored at the itemized (d-3) has reached the second predetermined value stored at the itemized (a); and (d-5) if it is judged, as a result of said judgment, that the counted value has reached the second predetermined value, the controller awarding a prize having a predetermined value, and, resetting the insurance BET number accumulatively stored at the itemized (c) to a default value.

7. The controlling method of a game system according to claim 5, wherein:

the controller, at the itemized (h), displays and executes a common game shared among said at least two or more gaming machines among from the plurality of gaming machines, on a central display device capable of communicating with the plurality of gaming machines.

* * * * *